US012615563B2

(12) United States Patent
Li et al.

(10) Patent No.: US 12,615,563 B2
(45) Date of Patent: Apr. 28, 2026

(54) CELL STATE SWITCHING METHOD AND APPARATUS

(71) Applicant: Huawei Technologies Co., Ltd., Shenzhen (CN)

(72) Inventors: Xinxian Li, Shanghai (CN); Mengying Ding, Shanghai (CN); Jinlin Peng, Shanghai (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 373 days.

(21) Appl. No.: 18/173,397

(22) Filed: Feb. 23, 2023

(65) Prior Publication Data

US 2023/0199586 A1 Jun. 22, 2023

Related U.S. Application Data

(63) Continuation of application No. PCT/CN2021/110641, filed on Aug. 4, 2021.

(30) Foreign Application Priority Data

Aug. 24, 2020 (CN) .......................... 202010859375.9
Oct. 21, 2020 (CN) .......................... 202011133816.3

(51) Int. Cl.
| | |
|---|---|
| *H04W 36/00* | (2009.01) |
| *H04L 5/00* | (2006.01) |
| *H04W 36/36* | (2009.01) |

(52) U.S. Cl.
CPC ....... *H04W 36/0083* (2013.01); *H04L 5/0098* (2013.01); *H04W 36/36* (2013.01)

(58) Field of Classification Search
CPC . H04W 72/23; H04W 72/21; H04W 36/0083; H04L 5/0098
See application file for complete search history.

(56) References Cited

U.S. PATENT DOCUMENTS

2018/0091268 A1 3/2018 Skov et al.
2018/0139750 A1* 5/2018 Takahashi ............... H04W 8/24
(Continued)

FOREIGN PATENT DOCUMENTS

| CN | 109586876 A | 4/2019 |
|---|---|---|
| CN | 109787726 A | 5/2019 |
| | (Continued) | |

OTHER PUBLICATIONS

Zte Corp, "Remaining Issues on Support of Tx Switching between Two Uplink Carriers", 3GPP TSG RAN WG1 Meeting #100, R1-2001132, e-Meeting, Feb. 24-Mar. 6, 2020, 18 pages.
(Continued)

*Primary Examiner* — Shukri Taha
(74) *Attorney, Agent, or Firm* — Slater Matsil, LLP

(57) ABSTRACT

A method and an apparatus for switching a cell state are provided, and relate to the field of communication technologies. The method includes: A terminal device receives a first instruction from a network device, and switches a serving cell state based on the first instruction. The first instruction indicates to switch the serving cell state of the terminal device to or from a first state. When the serving cell state is the first state, a downlink carrier of a serving cell supports downlink communication, and an uplink carrier of the serving cell does not support uplink communication.

18 Claims, 8 Drawing Sheets

(56)                    References Cited

U.S. PATENT DOCUMENTS

| | | | | |
|---|---|---|---|---|
| 2018/0375627 A1* | 12/2018 | Suzuki | ..................... | H04J 11/00 |
| 2019/0387516 A1* | 12/2019 | Yokomakura | ........... | H04L 5/001 |
| 2020/0045685 A1* | 2/2020 | Rico Alvarino | ...... | H04L 5/0048 |
| 2020/0336889 A1* | 10/2020 | Liang | ..................... | H04W 8/24 |
| 2021/0243750 A1* | 8/2021 | Ryu | ..................... | H04B 7/2643 |

FOREIGN PATENT DOCUMENTS

| | | | |
|---|---|---|---|
| CN | 109803348 A | 5/2019 |
| CN | 110012532 A | 7/2019 |
| WO | 2020155160 A1 | 8/2020 |
| WO | 2020167203 A1 | 8/2020 |

OTHER PUBLICATIONS

Qualcomm Inc, "On PHY Impact of Rel-15 LTECA SCell New State Agreements", 3GPP TSG RAN WG1 Meeting #92, R1-1802292, Athens, Greece, Feb. 26-Mar. 2, 2018, 3 pages.
Moderator (China Telecom), "Summary #3 of uplink Tx switching", 3GPP TSG RAN WG1 #100 bis, R1-2002793, e-Meeting, Apr. 20-30, 2020, 16 pages.
Interdigital Communications, "Report of e-mail discussion [71 #56] Enabling/Disabling of UL functionality", 3GPP TSG-RAN WG2 #71 bis, Tdoc R2-105703, Xian, China, Oct. 11-15, 2010, 16 pages.

* cited by examiner

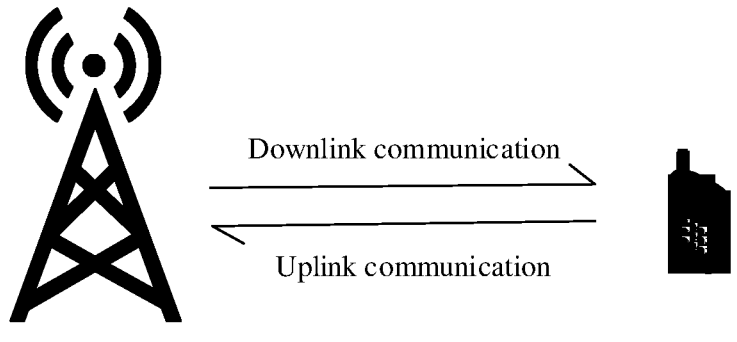

Downlink communication

Uplink communication

Network device                          Terminal device

FIG. 3

Network device                          Terminal device

401: First instruction indicating
to switch a serving cell state to →
or from a first state 402: Switch the serving cell state
based on the first instruction

FIG. 4

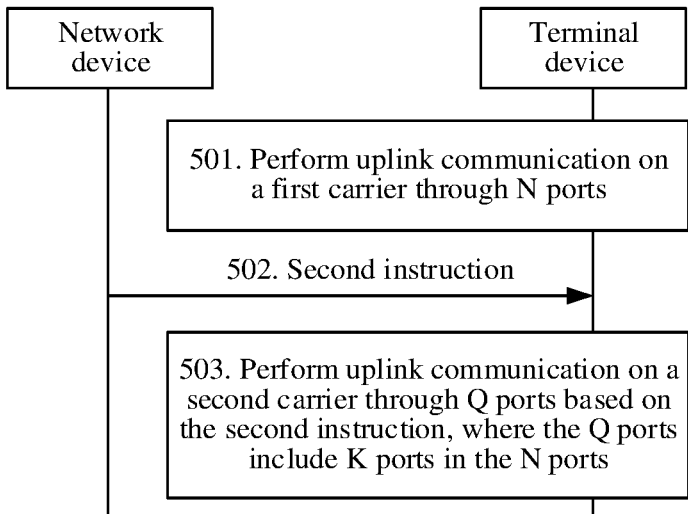

Network
device

Terminal
device

501. Perform uplink communication on
a first carrier through N ports

502. Second instruction →

503. Perform uplink communication on a
second carrier through Q ports based on
the second instruction, where the Q ports
include K ports in the N ports

FIG. 5

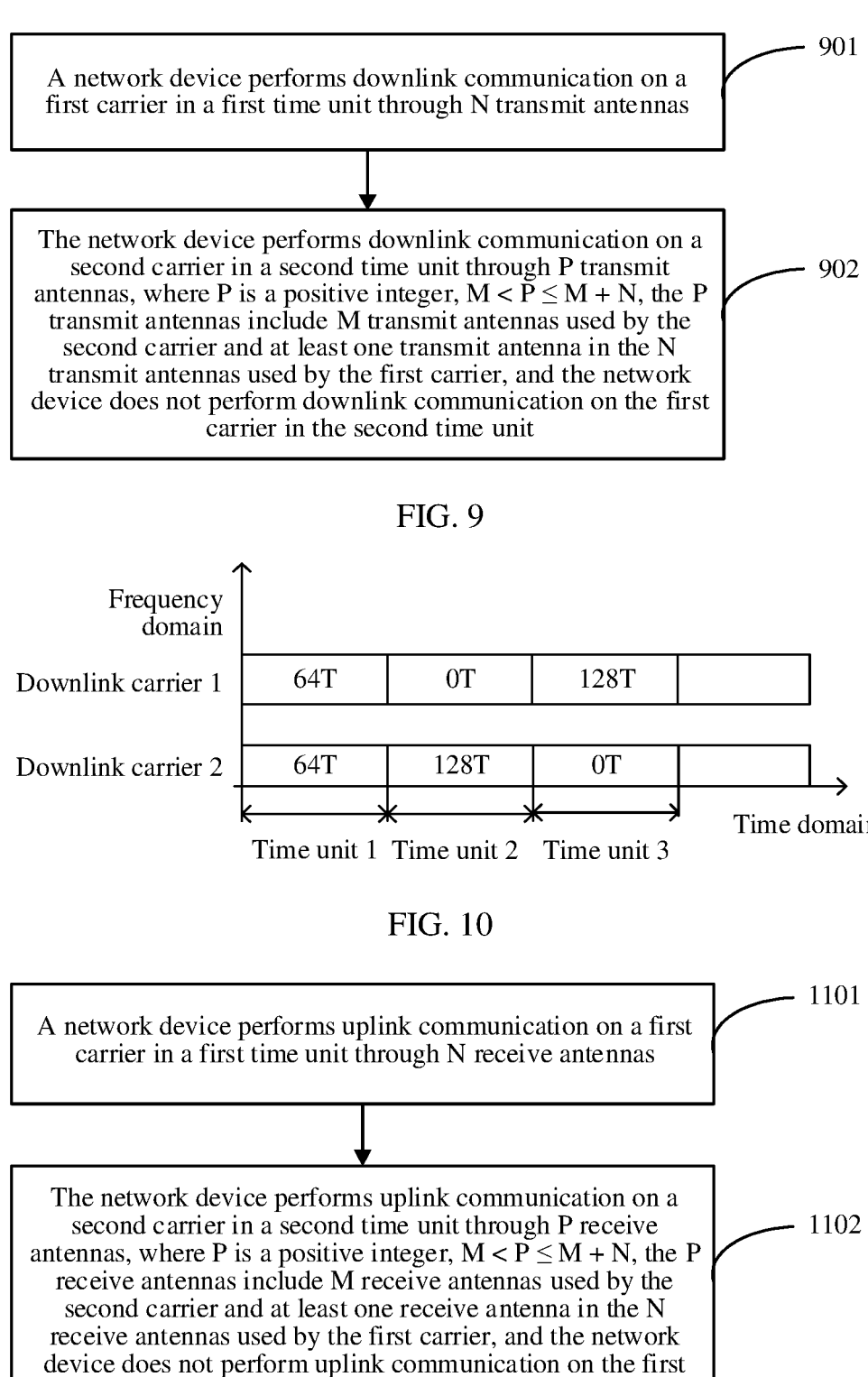

A network device performs downlink communication on a first carrier in a first time unit through N transmit antennas — 901

The network device performs downlink communication on a second carrier in a second time unit through P transmit antennas, where P is a positive integer, M < P ≤ M + N, the P transmit antennas include M transmit antennas used by the second carrier and at least one transmit antenna in the N transmit antennas used by the first carrier, and the network device does not perform downlink communication on the first carrier in the second time unit — 902

FIG. 9

Frequency domain

| Downlink carrier 1 | 64T | 0T | 128T | |
| Downlink carrier 2 | 64T | 128T | 0T | |

Time unit 1   Time unit 2   Time unit 3          Time domain

FIG. 10

A network device performs uplink communication on a first carrier in a first time unit through N receive antennas — 1101

The network device performs uplink communication on a second carrier in a second time unit through P receive antennas, where P is a positive integer, M < P ≤ M + N, the P receive antennas include M receive antennas used by the second carrier and at least one receive antenna in the N receive antennas used by the first carrier, and the network device does not perform uplink communication on the first carrier in the second time unit — 1102

FIG. 11

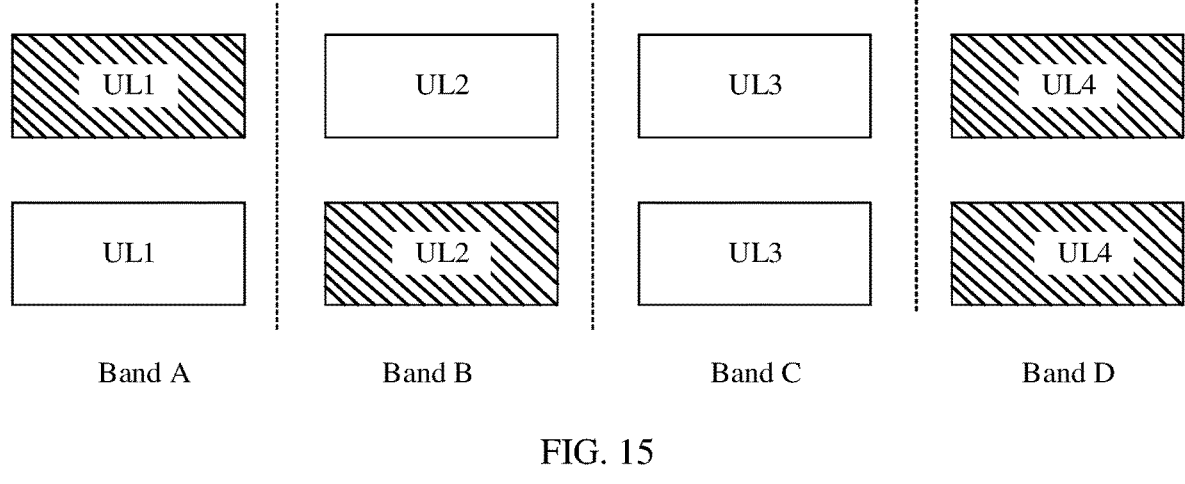
Band A                 Band B                 Band C                 Band D
FIG. 15
Frequency domain
CC4
CC3
CC2                    CC2
CC1
T8 Time domain
FIG. 16A
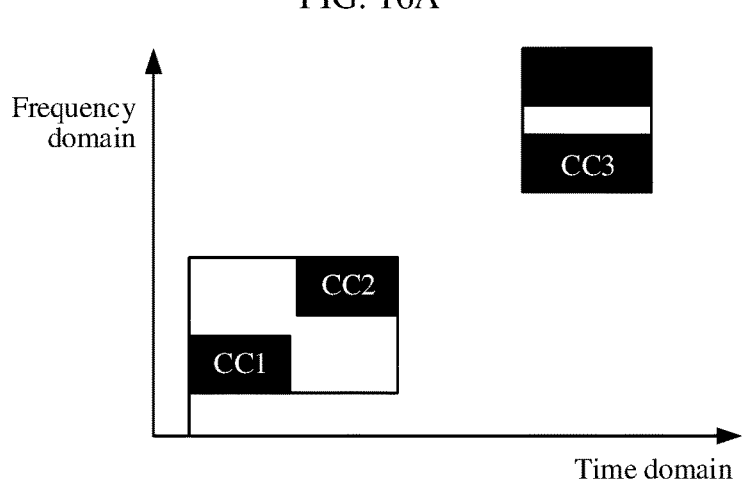
FIG. 16B

CELL STATE SWITCHING METHOD AND APPARATUS

CROSS-REFERENCE TO RELATED APPLICATIONS

This application is a continuation of International Application No. PCT/CN2021/110641, filed on Aug. 4, 2021, which claims priority to Chinese Patent Application No. 202010859375.9, filed on Aug. 24, 2020 and Chinese Patent Application No. 202011133816.3, filed on Oct. 21, 2020. All of the aforementioned applications are incorporated herein by reference in their entireties.

TECHNICAL FIELD

This application relates to the field of communication technologies, and in particular, to a cell state switching method and an apparatus.

BACKGROUND

In wireless communication, for a terminal device, a cell state of a serving cell (hereinafter referred to as a serving cell state) usually includes an active state, an inactive state, and a dormant state. When the serving cell state is the active state, the terminal device can perform communication via the serving cell. When the serving cell state is the inactive state or the dormant state, the terminal device cannot perform communication via the serving cell. In the case that a network device configures a plurality of serving cells for the terminal device, a quantity of active-state serving cells among the serving cells is subject to a capability of the terminal device. Therefore, the terminal device needs to switch a serving cell state, to meet communication requirements of the terminal device in different serving cells. However, it is time-consuming for the terminal device to switch the serving cell state, resulting in poor communication performance.

SUMMARY

Embodiments of this application provide a cell state switching method and an apparatus, so that a serving cell state can be switched from an active state to a first state or from a first state to an active state, to help reduce a latency of serving cell state switching and improve communication performance.

According to a first aspect, a cell state switching method according to an embodiment of this application specifically includes:

A terminal device receives a first instruction from a network device. The first instruction indicates to switch a serving cell state of the terminal device to or from a first state. That the serving cell state is the first state includes: A downlink carrier of a serving cell supports downlink communication, and an uplink carrier of the serving cell does not support uplink communication. Then, the terminal device switches the serving cell state based on the first instruction.

In embodiments of this application, the first state is introduced, so that the terminal device can switch the serving cell state to or from the first state based on communication requirements of the terminal device in different serving cells in the case that a quantity of active-state serving cells among serving cells is subject to a capability of the terminal, thereby helping reduce a latency of serving cell state switching and improve communication performance.

In a possible design, when the first instruction indicates to activate the serving cell, the terminal device switches the serving cell state from the first state to an active state based on the first instruction. Therefore, the terminal device can switch the serving cell state from the first state to the active state based on the first instruction from the network device.

In a possible design, when the first instruction indicates to deactivate the serving cell, the terminal device switches the serving cell state from the first state to an inactive state based on the first instruction. Therefore, the terminal device can switch the serving cell state from the first state to the inactive state based on the first instruction from the network device.

In a possible design, when the first instruction indicates to configure the serving cell state as the first state, the terminal device switches the serving cell state from an inactive state or an active state to the first state based on the first instruction. Therefore, the terminal device can switch the serving cell state to the first state based on the first instruction from the network device.

In a possible design, when a quantity of ports of an uplink carrier of the serving cell is 0, the uplink carrier of the serving cell does not support uplink communication.

In a possible design, when the first instruction indicates to set a quantity of ports of an uplink carrier of the serving cell to 0, the terminal device switches the serving cell state from an inactive state or an active state to the first state based on the first instruction. Therefore, the terminal device can switch the serving cell state to the first state based on the first instruction from the network device.

In a possible design, when the first instruction indicates to set a quantity of ports of an uplink carrier of the serving cell to N, where N is a positive integer, $0 < N \leq M$, and M is a maximum quantity of ports supported by uplink communication of the terminal device, the terminal device switches the serving cell state from the first state to an active state based on the first instruction. Therefore, the terminal device can switch the serving cell state from the first state to the active state based on the first instruction from the network device.

In a possible design, when a preconfigured quantity of ports of an active bandwidth part BWP on an uplink carrier of the serving cell is 0, a quantity of ports of the uplink carrier of the serving cell is 0.

In a possible design, when the first instruction indicates to activate a BWP whose preconfigured quantity of ports is 0 on an uplink carrier of the serving cell, the terminal device switches the serving cell state from an inactive state or an active state to the first state based on the first instruction. Therefore, the terminal device can switch the serving cell state to the first state based on the first instruction from the network device.

In a possible design, when the first instruction indicates to deactivate a BWP whose preconfigured quantity of ports is 0 on an uplink carrier of the serving cell, the terminal device switches the serving cell state from the first state to an inactive state based on the first instruction. Therefore, the terminal device can switch the serving cell state from the first state to the inactive state based on the first instruction from the network device.

In a possible design, when the first instruction indicates to activate a BWP whose preconfigured quantity of ports is N on an uplink carrier of the serving cell, where N is a positive integer, $0 < N \leq M$, and M is a maximum quantity of ports supported by uplink communication of the terminal device, the terminal device switches the serving cell state from the first state to an active state based on the first instruction. Therefore, the terminal device can switch the serving cell state from the first state to the active state based on the first instruction from the network device.

In a possible design, when a quantity of channels of an uplink carrier of the serving cell is 0, the uplink carrier of the serving cell does not support uplink communication.

In a possible design, when a preconfigured quantity of channels of an active BWP on an uplink carrier of the first cell is 0, a quantity of channels on the uplink carrier of the serving cell is 0.

In a possible design, when the first instruction indicates to deactivate an uplink carrier of the serving cell, the terminal device switches the serving cell state from an active state to the first state based on the first instruction. Therefore, the terminal device can switch the serving cell state to the first state based on the first instruction from the network device.

In a possible design, when the first instruction indicates to activate a downlink carrier of the serving cell, the terminal device switches the serving cell state from an inactive state to the first state based on the first instruction. Therefore, the terminal device can switch the serving cell state to the first state based on the first instruction from the network device.

In a possible design, when the first instruction indicates to deactivate a downlink carrier of the serving cell, the terminal device switches the serving cell state from the first state to an inactive state based on the first instruction. Therefore, the terminal device can switch the serving cell state from the first state to the inactive state based on the first instruction from the network device.

In a possible design, when the first instruction indicates to activate an uplink carrier of the serving cell, the terminal device switches the serving cell state from the first state to an active state based on the first instruction. Therefore, the terminal device can switch the serving cell state from the first state to the active state based on the first instruction from the network device.

In a possible design, when the serving cell state is the first state, a cell state identifier of the serving cell is a first cell state identifier.

In a possible design, when the first instruction indicates to configure the cell state identifier of the serving cell as the first cell state identifier, the terminal device switches the serving cell state from an inactive state or an active state to the first state based on the first instruction. Therefore, the terminal device can switch the serving cell state to the first state based on the first instruction from the network device.

In a possible design, when the first instruction indicates to configure the cell state identifier of the serving cell as a second cell state identifier, the second cell state identifier indicates that the serving cell state is an inactive state or an active state; and the terminal device switches the serving cell state from the first state to the inactive state or the active state based on the first instruction. Therefore, the terminal device can switch the serving cell state from the first state to the inactive state or the active state based on the first instruction from the network device.

In a possible design, the terminal device sends capability information to the network device, where the capability information includes a band supported by the terminal device, and a maximum quantity of channels and/or a maximum quantity of ports supported by the band. This helps the network device indicate the terminal device to perform serving cell state switching.

In a possible design, the serving cell is a primary cell or a secondary cell of the terminal device. Therefore, this may be applied to a scenario in which a plurality of serving cells are configured for the terminal device, for example, a CA scenario or a DC scenario.

According to a second aspect, a cell state switching method according to an embodiment of this application specifically includes: A network device generates a first instruction, and then sends the first instruction to a terminal device. The first instruction indicates to switch a serving cell state of a terminal device to or from a first state. That the serving cell state is the first state includes: A downlink carrier of a serving cell supports downlink communication, and an uplink carrier of the serving cell does not support uplink communication.

In a possible design, that the first instruction indicates to switch the serving cell state of the terminal device from the first state is that the first instruction indicates to switch the serving cell state of the terminal device from the first state to an active state, including: the first instruction indicates to activate the serving cell.

In a possible design, that the first instruction indicates to switch the serving cell state of the terminal device from the first state is that the first instruction indicates to switch the serving cell state of the terminal device from the first state to an inactive state, including: the first instruction indicates to deactivate the serving cell.

In a possible design, that the first instruction indicates to switch the serving cell state of the terminal device to the first state is that the first instruction indicates to switch the serving cell state of the terminal device from an inactive state or an active state to the first state, including: the first instruction indicates to configure the serving cell state as the first state.

In a possible design, that the uplink carrier of the serving cell does not support uplink communication includes: a quantity of ports of the uplink carrier of the serving cell is 0.

In a possible design, that the first instruction indicates to switch the serving cell state of the terminal device to the first state is that the first instruction indicates to switch the serving cell state of the terminal device from an inactive state or an active state to the first state, including: the first instruction indicates to set the quantity of ports of the uplink carrier of the serving cell to 0.

In a possible design, that the first instruction indicates to switch the serving cell state of the terminal device from the first state is that the first instruction indicates to switch the serving cell state of the terminal device from the first state to an active state, including: the first instruction indicates to set a quantity of ports of an uplink carrier of the serving cell to N, where N is a positive integer, $0<N\leq M$, and M is a maximum quantity of ports supported by uplink communication of the terminal device.

In a possible design, that the quantity of ports of the uplink carrier of the serving cell is 0 includes: a preconfigured quantity of ports of an active bandwidth part BWP on the uplink carrier of the serving cell is 0.

In a possible design, that the first instruction indicates to switch the serving cell state of the terminal device to the first state is that the first instruction indicates to switch the serving cell state of the terminal device from an inactive state or an active state to the first state, including: the first instruction indicates to activate a BWP whose preconfigured quantity of ports is 0 on the uplink carrier of the serving cell.

In a possible design, that the first instruction indicates to switch the serving cell state of the terminal device from the first state is that the first instruction indicates to switch the serving cell state of the terminal device from the first state to an inactive state, including: the first instruction indicates to deactivate a BWP whose preconfigured quantity of ports is 0 on the uplink carrier of the serving cell.

In a possible design, that the first instruction indicates to switch the serving cell state of the terminal device from the first state is that the first instruction indicates to switch the serving cell state of the terminal device from the first state to an active state, including: the first instruction indicates to activate a BWP whose preconfigured quantity of ports is N on the uplink carrier of the serving cell, where N is a positive integer, $0 < N \leq M$, and M is a maximum quantity of ports supported by uplink communication of the terminal device.

In a possible design, that the uplink carrier of the serving cell does not support uplink communication includes: a quantity of channels of the uplink carrier of the serving cell is 0.

In a possible design, that the quantity of channels of the uplink carrier of the serving cell is 0 includes: a preconfigured quantity of channels of an active BWP on the uplink carrier of the first cell is 0.

In a possible design, that the first instruction indicates to switch the serving cell state of the terminal device to the first state is that the first instruction indicates to switch the serving cell state of the terminal device from an active state to the first state, including: the first instruction indicates to deactivate the uplink carrier of the serving cell.

In a possible design, that the first instruction indicates to switch the serving cell state of the terminal device to the first state is that the first instruction indicates to switch the serving cell state of the terminal device from an inactive state to the first state, including: the first instruction indicates to activate the downlink carrier of the serving cell.

In a possible design, that the first instruction indicates to switch the serving cell state of the terminal device from the first state is that the first instruction indicates to switch the serving cell state of the terminal device from the first state to an inactive state, including: the first instruction indicates to deactivate the downlink carrier of the serving cell.

In a possible design, that the first instruction indicates to switch the serving cell state of the terminal device from the first state is that the first instruction indicates to switch the serving cell state of the terminal device from the first state to an active state, including: the first instruction indicates to activate the uplink carrier of the serving cell.

In a possible design, when the serving cell state is the first state, a cell state identifier of the serving cell is a first cell state identifier.

In a possible design, that the first instruction indicates to switch the serving cell state of the terminal device to the first state is that the first instruction indicates to switch the serving cell state of the terminal device from an inactive state or an active state to the first state, including: the first instruction indicates to configure the cell state identifier of the serving cell as the first cell state identifier.

In a possible design, that the first instruction indicates to switch the serving cell state of the terminal device from the first state is that the first instruction indicates to switch the serving cell state of the terminal device from the first state to an inactive state, including: the first instruction indicates to configure the cell state identifier of the serving cell as a second cell state identifier, where the second cell state identifier indicates that the serving cell state is the inactive state or the active state.

In a possible design, the network device receives capability information from the terminal device, where the capability information includes a band supported by the terminal device, and a maximum quantity of channels and/or a maximum quantity of ports supported by the band.

In a possible design, the serving cell is a primary cell or a secondary cell of the terminal device.

Notably, for technical effects brought by any possible design manner of the second aspect, refer to technical effects brought by different design manners of the first aspect. Details are not described herein again.

According to a third aspect, a communication method according to an embodiment of this application specifically includes:

A terminal device performs uplink communication on a first carrier through N ports, where N is a positive integer.

The terminal device receives a first instruction from a network device. The first instruction indicates to perform uplink communication on a second carrier through Q ports. The Q ports include K ports in the N ports, where K and Q are positive integers, $0 < K \leq N$, and $N-K+Q$ does not exceed a maximum quantity of ports supported by uplink communication of the terminal device.

The terminal device performs uplink communication on the second carrier through the Q ports based on the first instruction.

In embodiments of this application, because the network device may configure ports configured for the first carrier for the second carrier to use, thereby improving utilization of ports, and helping improve uplink communication efficiency of the terminal device.

In a possible design, after first duration since the terminal device receives the first instruction, the terminal device performs uplink communication on the second carrier through the Q ports. The first duration is a port switching latency of the second carrier. This helps improve communication reliability.

In a possible design, the port switching latency of the second carrier is predefined. This helps reduce signaling overheads.

In a possible design, the terminal device sends capability information to the network device, where the capability information includes a band supported by the terminal device, and a maximum quantity of ports supported by the band.

According to a fourth aspect, another communication method according to an embodiment of this application specifically includes:

A terminal device performs downlink communication on a first carrier through N ports, where N is a positive integer.

The terminal device receives a first instruction from a network device. The first instruction indicates to perform downlink communication on a second carrier through Q ports. The Q ports include K ports in the N ports, where K and Q are positive integers, $0 < K \leq N$, and $N-K+Q$ does not exceed a maximum quantity of ports supported by downlink communication of the terminal device.

The terminal device performs downlink communication on the second carrier through the Q ports based on the first instruction.

In embodiments of this application, because the network device may configure ports configured for the first carrier for the second carrier to use, thereby improving utilization of ports, and helping improve downlink communication efficiency of the terminal device.

In a possible design, after first duration since the terminal device receives the first instruction, the terminal device performs downlink communication on the second carrier through the Q ports. The first duration is a port switching latency of the second carrier. This helps improve communication reliability.

According to a fifth aspect, a communication method according to an embodiment of this application specifically includes:

A network device performs downlink communication on a first carrier in a first time unit through N transmit antennas, and performs downlink communication on a second carrier in the first time unit through M transmit antennas, where M and N are positive integers.

The network device performs downlink communication on the second carrier in a second time unit through P transmit antennas, where P is a positive integer, $M<P\leq M+N$, the P transmit antennas include at least one transmit antenna in the M transmit antennas used by the second carrier and the N transmit antennas used by the first carrier, and the network device does not perform downlink communication on the first carrier in the second time unit.

In embodiments of this application, because the network device may configure transmit antennas configured for the first carrier for the second carrier to use, thereby improving utilization of transmit antennas, and helping improve downlink communication efficiency.

According to a sixth aspect, a communication method according to an embodiment of this application specifically includes:

A network device performs uplink communication on a first carrier in a first time unit through N receive antennas, and performs uplink communication on a second carrier in the first time unit through M receive antennas, where M and N are positive integers.

The network device performs uplink communication on the second carrier in a second time unit through P receive antennas, where P is a positive integer, $M<P\leq M+N$, the P receive antennas include the M receive antennas used by the second carrier and at least one receive antenna in the N receive antennas used by the first carrier, and the network device does not perform uplink communication on the first carrier in the second time unit.

In embodiments of this application, because the network device may configure receive antennas configured for the first carrier for the second carrier to use, thereby improving utilization of receive antennas, and helping improve uplink communication efficiency.

According to a seventh aspect, this application provides a communication apparatus. The communication apparatus may be a terminal device or may be an apparatus in a terminal device or an apparatus that can be used in coordination with a terminal device. The apparatus may include a processing module and a transceiver module. In addition, the processing module and the transceiver module may implement corresponding functions in the method according to the first aspect or any design of the first aspect. Details are as follows:

The transceiver module is configured to receive a first instruction from a network device. The first instruction indicates to switch a serving cell state of the terminal device to or from a first state. That the serving cell state is the first state includes: A downlink carrier of a serving cell supports downlink communication, and an uplink carrier of the serving cell does not support uplink communication. The processing module is configured to switch the serving cell state based on the first instruction.

According to an eighth aspect, this application provides a communication apparatus. The communication apparatus may be a network device or may be an apparatus in a network device or an apparatus that can be used in combination with a network device. The apparatus may include a processing module and a transceiver module. In addition, the processing module and the transceiver module may implement corresponding functions in the method according to the second aspect or any design of the second aspect. Details are as follows:

The processing module is configured to generate a first instruction. The transceiver module is configured to send the first instruction to a terminal device. The first instruction indicates to switch a serving cell state of a terminal device to or from a first state. That the serving cell state is the first state includes: A downlink carrier of a serving cell supports downlink communication, and an uplink carrier of the serving cell does not support uplink communication.

According to a ninth aspect, this application provides a communication apparatus. The communication apparatus may be a terminal device or may be an apparatus in a terminal device or an apparatus that can be used in coordination with a terminal device. The apparatus may include a processing module and a transceiver module. In addition, the processing module and the transceiver module may implement corresponding functions in the method according to the first aspect or any design of the first aspect. Details are as follows:

The transceiver module is configured to perform uplink communication on a first carrier through N ports, where N is a positive integer.

The transceiver module is configured to receive a first instruction from a network device. The first instruction indicates to perform uplink communication on a second carrier through Q ports. The Q ports include K ports in the N ports, where K and Q are positive integers, $0<K\leq N$, and $N-K+Q$ does not exceed a maximum quantity of ports supported by uplink communication of the terminal device.

The processing module is configured to trigger, based on the first instruction, the transceiver module to perform uplink communication on the second carrier through the Q ports.

According to a tenth aspect, this application provides a communication apparatus. The communication apparatus may be a terminal device or may be an apparatus in a terminal device or an apparatus that can be used in coordination with a terminal device. The apparatus may include a processing module and a transceiver module. In addition, the processing module and the transceiver module may implement corresponding functions in the method according to the first aspect or any design of the first aspect. Details are as follows:

The transceiver module is configured to perform downlink communication on a first carrier through N ports, where N is a positive integer.

The transceiver module is configured to receive a first instruction from a network device. The first instruction indicates to perform downlink communication on a second carrier through Q ports. The Q ports include K ports in the N ports, where K and Q are positive integers, $0<K\leq N$, and $N-K+Q$ does not exceed a maximum quantity of ports supported by downlink communication of the terminal device.

The processing module is configured to trigger, based on the first instruction, the transceiver module to perform downlink communication on a second carrier through the Q ports.

According to an eleventh aspect, this application provides a communication apparatus. The communication apparatus may be a network device or may be an apparatus in a network device or an apparatus that can be used in combination with a network device. The apparatus may include a processing module and a transceiver module. In addition, the processing module and the transceiver module may implement corresponding functions in the method according to the first aspect or any design of the first aspect. Details are as follows:

The transceiver module is configured to perform downlink communication on a first carrier in a first time unit through N transmit antennas, and perform downlink communication on a second carrier in the first time unit through M transmit antennas, where M and N are positive integers.

The transceiver module is configured to perform downlink communication on the second carrier in a second time unit through P transmit antennas, where P is a positive integer, $M<P \leq M+N$, the P transmit antennas include at least one transmit antenna in the M transmit antennas used by the second carrier and the N transmit antennas used by the first carrier, and the processing module is configured to control the transceiver module not to perform downlink communication on the first carrier in the second time unit.

According to a twelfth aspect, this application provides a communication apparatus. The communication apparatus may be a network device or may be an apparatus in a network device or an apparatus that can be used in combination with a network device. The apparatus may include a processing module and a transceiver module. In addition, the processing module and the transceiver module may implement corresponding functions in the method according to the first aspect or any design of the first aspect. Details are as follows:

The transceiver module is configured to perform uplink communication on a first carrier in a first time unit through N receive antennas, and perform uplink communication on a second carrier in the first time unit through M receive antennas, where M and N are positive integers.

The transceiver module is configured to perform uplink communication on the second carrier in a second time unit through P receive antennas, where P is a positive integer, $M<P \leq M+N$, the P receive antennas include the M receive antennas used by the second carrier and at least one receive antenna in the N receive antennas used by the first carrier, and the processing module is configured to control the transceiver module not to perform uplink communication on the first carrier in the second time unit.

According to a thirteenth aspect, an embodiment of this application provides a communication apparatus. The communication apparatus includes a processor, configured to implement the method described in the first aspect, the third aspect, and/or the fourth aspect. The communication apparatus may further include a memory, configured to store a computer program and data. The memory is coupled to the processor. When executing the computer program stored in the memory, the processor may implement the method described in the first aspect, the third aspect, and/or the fourth aspect. The apparatus may further include a communication interface. The communication interface is used by the apparatus to communicate with another device. For example, the communication interface may be a transceiver, a circuit, a bus, a module, or a communication interface of another type, and the another device may be a network device or a terminal device.

In a possible design, the communication apparatus includes a memory and a processor.

The memory is configured to store a computer program.

The processor is configured to invoke the computer program stored in the memory, to enable the communication apparatus to perform the method according to the first aspect or any possible design of the first aspect of embodiments of this application, or enable the apparatus to perform the method according to the third aspect or any possible design of the third aspect of embodiments of this application, or enable the apparatus to perform the method according to the fourth aspect or any possible design of the fourth aspect of embodiments of this application.

According to a fourteenth aspect, an embodiment of this application provides a communication apparatus. The communication apparatus includes a processor, configured to implement the method described in the second aspect, the fifth aspect, and/or the sixth aspect. The communication apparatus may further include a memory, configured to store a computer program and data. The memory is coupled to the processor. When executing the computer program stored in the memory, the processor may implement the method described in the second aspect, the fifth aspect, and/or the sixth aspect. The apparatus may further include a communication interface. The communication interface is used by the apparatus to communicate with another device. For example, the communication interface may be a transceiver, a circuit, a bus, a module, or a communication interface of another type, and the another device may be a network device or a terminal device.

In a possible design, the communication apparatus includes a memory and a processor.

The memory is configured to store a computer program.

The processor is configured to invoke the computer program stored in the memory, to enable the communication apparatus to perform the method according to the second aspect or any possible design of the second aspect of embodiments of this application, or enable the apparatus to perform the method according to the fifth aspect or any possible design of the fifth aspect of embodiments of this application, or enable the apparatus to perform the method according to the sixth aspect or any possible design of the sixth aspect of embodiments of this application.

According to a fifteenth aspect, embodiments of this application further provide a computer-readable storage medium, including a computer program. When the computer program is run on a computer, the computer is enabled to perform the method according to the first aspect or any possible design of the first aspect of embodiments of this application, or the method according to the second aspect or any possible design of the second aspect of embodiments of this application, or the method according to the third aspect or any possible design of the third aspect of embodiments of this application, or the method according to the fourth aspect or any possible design of the fourth aspect of embodiments of this application, or the method according to the fifth aspect or any possible design of the fifth aspect of embodiments of this application, or the method according to the sixth aspect or any possible design of the sixth aspect of embodiments of this application.

According to a sixteenth aspect, embodiments of this application further provide a chip system. The chip system includes a processor, and may further include a memory, configured to implement the method according to the first aspect or any possible design of the first aspect of embodiments of this application, or the method according to the second aspect or any possible design of the second aspect of embodiments of this application, or the method according to the third aspect or any possible design of the third aspect of embodiments of this application, or the method according to the fourth aspect or any possible design of the fourth aspect of embodiments of this application, or the method according to the fifth aspect or any possible design of the fifth aspect of embodiments of this application, or the method according to the sixth aspect or any possible design of the sixth aspect of embodiments of this application. The chip system may include a chip, or include a chip and another discrete device.

According to a seventeenth aspect, embodiments of this application further provide a computer-readable storage medium, including a computer program. When the computer program is run on a computer, the computer is enabled to perform the method according to the first aspect or any possible design of the first aspect of embodiments of this application, or the method according to the second aspect or any possible design of the second aspect of embodiments of this application, or the method according to the third aspect or any possible design of the third aspect of embodiments of this application, or the method according to the fourth aspect or any possible design of the fourth aspect of embodiments of this application, or the method according to the fifth aspect or any possible design of the fifth aspect of embodiments of this application, or the method according to the sixth aspect or any possible design of the sixth aspect of embodiments of this application.

In addition, for technical effects brought by any possible design manner of the seventh aspect to the seventeenth aspect, refer to technical effects brought by different design manners in the method part. Details are not described herein again.

BRIEF DESCRIPTION OF THE DRAWINGS

FIG. 3 is a schematic diagram of a network architecture of a communication system according to an embodiment of this application;

FIG. 4 is a schematic flowchart of a cell state switching method according to an embodiment of this application;

FIG. 5 is a schematic flowchart of a communication method according to an embodiment of this application;

FIG. 9 is a schematic flowchart of another communication method according to an embodiment of this application;

FIG. 10 is a schematic diagram of a case of using antennas by different carriers according to another embodiment of this application;

FIG. 11 is a schematic flowchart of another communication method according to an embodiment of this application;

FIG. 15 is a schematic diagram of capability information reported by a terminal according to an embodiment of this application;

FIG. 16A is a schematic diagram of a CC combination according to an embodiment of this application; and FIG. 16B is a schematic diagram of another CC combination according to an embodiment of this application.

DETAILED DESCRIPTION OF ILLUSTRATIVE EMBODIMENTS

Figure 1A:
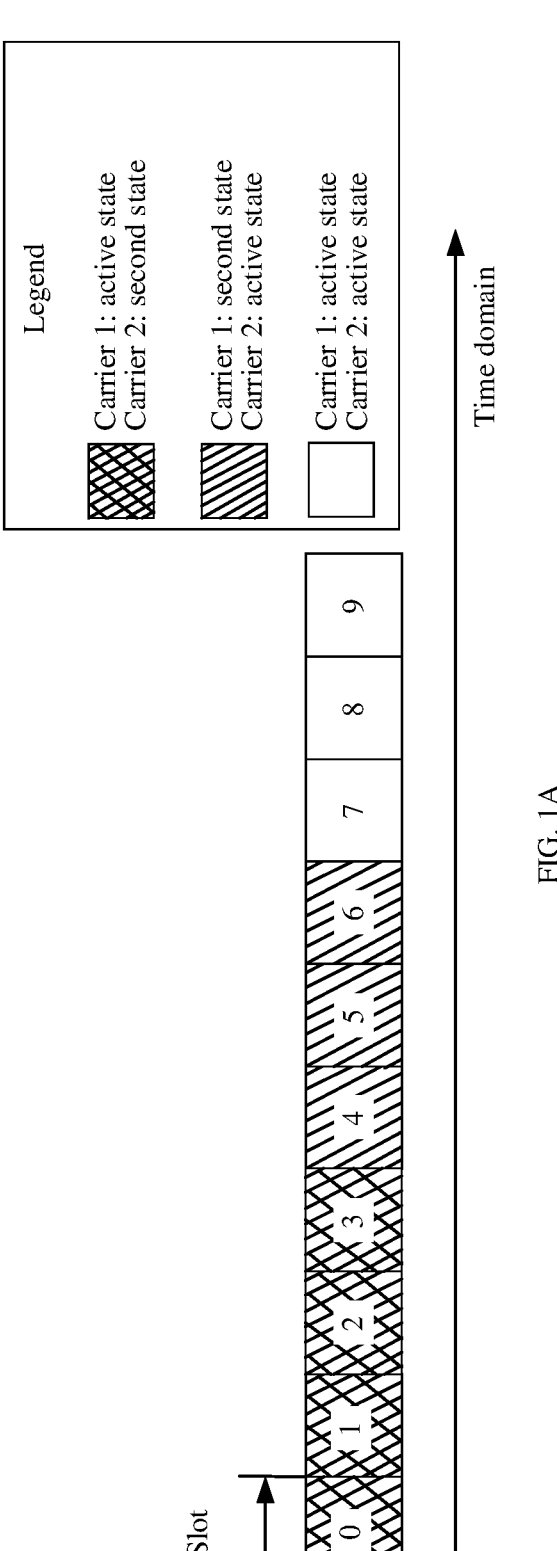
FIG. 1A is a schematic diagram of a time pattern according to an embodiment of this application.

In embodiments of this application, a serving cell state (which, for example, is referred to as a first state in embodiments of this application) is introduced, so that in a case in which a quantity of active-state serving cells is subject to a capability of a terminal, the terminal device can switch a serving cell state from an active state to a first state or from a first state to an active state based on communication requirements of the terminal device in different serving cells, without switching from an active state to an inactive state or a dormant state or switching from an inactive state or a dormant state to an active state, which helps reduce a latency of serving cell state switching and improve communication performance. When the serving cell state of the terminal device is the first state, a downlink carrier of a serving cell supports downlink communication, and an uplink carrier of the serving cell does not support uplink communication.

In embodiments of this application, "at least one" means one or more, and "a plurality of" means two or at least two. The term "and/or" describes an association relationship between associated objects, and indicates that three relationships may exist. For example, A and/or B may indicate the following cases: Only A exists, both A and B exist, and only B exists, where A and B may be singular or plural. The character "/" usually indicates an "or" relationship between associated objects. "At least one of the following pieces (items)" or a similar expression thereof indicates any combination of these items, including a single item (piece) or any combination of a plurality of items (pieces). For example, at least one (piece) of a, b, or c may represent a, b, c, a and b, a and c, b and c, or a, b, and c, where each of a, b, and c may be an element, or may be a set including one or more elements.

In embodiments of this application, "example", "in some embodiments", "in another embodiment", and the like are used to represent an example, an illustration, or a description. Any embodiment or design scheme described as an "example" in this application should not be explained as being more preferred or having more advantages than another embodiment or design scheme. Specifically, the term "example" is used to present a concept in a specific manner.

In embodiments of this application, "of (of)", "relevant (relevant)", and "corresponding (corresponding)" may be interchangeably used sometimes. Notably, meanings expressed by the terms are consistent when differences are not emphasized. In embodiments of this application, communication and transmission may be used interchangeably sometimes. Notably, meanings expressed by the terms are consistent when differences are not emphasized. For example, transmitting may include sending and/or receiving, and may be in a noun form or a verb form. In another example, a port is equivalent to an antenna port, and may be used interchangeably.

Notably, in embodiments of this application, terms such as "first" and "second" are only used for a purpose of distinction in description, and should not be understood as an indication or implication of relative importance or an indication or implication of a sequence. In embodiments of this application, "equal to" may be used together with "greater than", and this is applicable to a technical solution used when "greater than" is used; or "equal to" may be used together with "less than", and this is applicable to a technical solution used when "less than" is used. Notably, when "equal to" is used together with "greater than", "equal to" is not used together with "less than", or when "equal to" is used together with "less than", "equal to" is not used together with "greater than".

In the following, some terms in embodiments of this application are described, so as to help a person skilled in the art have a better understanding.

1. Terminal device: In embodiments of this application, the terminal device is a device with a wireless transceiver function, and may be referred to as a terminal, user equipment (UE), a mobile station (MS), a mobile terminal (MT), an access terminal device, a vehicle-mounted terminal device, an industrial control terminal device, a UE unit, a UE station, a mobile station, a remote station, a remote terminal device, a mobile device, a UE terminal device, a wireless communication device, a UE agent, a UE apparatus, or the like. The terminal device may be fixed or movable. Notably, the terminal device may support at least one wireless communication technology, for example, Long Term Evolution (LTE), New Radio (NR), or Wideband Code Division Multiple Access (WCDMA). For example, the terminal device may be a mobile phone, a tablet computer, a desktop computer, a notebook computer, an all-in-one computer, a vehicle-mounted terminal, a virtual reality (VR) terminal device, an augmented reality (AR) terminal device, a wireless terminal in industrial control, a wireless terminal in self-driving, a wireless terminal in remote surgery (remote medical surgery), a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a wearable device, a terminal device in a future mobile communication network, a terminal device in a future evolved public land mobile network (PLMN), or the like. In some embodiments of this application, the terminal device may alternatively be an apparatus having a transceiver function, for example, a chip system. The chip system may include a chip, and may further include another discrete component.

2. Network device: In embodiments of this application, a network device is a device that provides a wireless access function for a terminal device, and may also be referred to as an access network device, a radio access network (RAN) device, or the like. The network device may support at least one wireless communication technology, such as LTE, NR, or WCDMA. For example, the network device includes, but is not limited to, a next-generation base station (gNB), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a transmission and reception point (TRP), and a transmission point (TP), a mobile switching center, and the like in a fifth-generation mobile communication system (5th-generation, 5G). The network device may alternatively be a radio controller, a central unit (CU), and/or a distributed unit (DU) in a cloud radio access network (CRAN) scenario. Alternatively, the network device may be a relay station, an access point, a vehicle-mounted device, a terminal device, a wearable device, a network device in future mobile communication, a network device in a future evolved PLMN, or the like. In some embodiments, the network device may alternatively be an apparatus, for example, a chip system, that provides a wireless communication function for the terminal device. For example, the chip system may include a chip, and may further include another discrete component.

3. Carrier: In embodiments of this application, carriers may be classified into uplink carriers and downlink carriers based on uplink communication and downlink communication. The uplink carriers are for uplink communication. The downlink carriers are for downlink communication. The uplink carriers include normal uplink carriers and supplementary uplink carriers SUL.

4. Carrier bandwidth part: A carrier bandwidth part in embodiments of this application may be referred to as a bandwidth part (BWP) for short, and is a segment of consecutive or non-consecutive frequency domain resources on a carrier. A bandwidth of this segment of consecutive or non-consecutive frequency domain resources does not exceed a bandwidth capability of the terminal device. In other words, a bandwidth of the BWP is less than or equal to a maximum bandwidth supported by the terminal device. For example, a BWP configured on an uplink carrier is an uplink BWP, and a BWP configured on a downlink carrier is a downlink BWP.

5. Time unit: A time unit in embodiments of this application is a period of time in time domain. For example, the terminal device and the network device may communicate with each other in time domain at a granularity of time units. For example, the time unit may be a slot, a symbol, a subframe, a radio frame, or a mini-slot. This is not limited. In addition, duration of one time unit is related to a subcarrier spacing. The slot is used as an example. When the subcarrier spacing is 15 kHz, duration of one slot is 1 ms. When the subcarrier spacing is 30 kHz, duration of one slot is 0.5 ms.

6. Serving cell: A serving cell in embodiments of this application is a cell that provides a service for the terminal device. For example, in a carrier aggregation (CA) scenario, a serving cell may be a primary cell (PCell), or may be a secondary cell (SCell). Generally, the PCell is a cell accessed by the terminal device when the terminal device performs an initial connection, or the PCell is a cell configured by the network device when the terminal device reestablishes a radio resource control (RRC) connection, or the PCell is a cell specified by the network device or the terminal device in a terminal device handover process. The SCell is added via RRC signaling (which may also be referred to as an RRC message) after the terminal device completes initial access, and is for providing an additional radio resource. Notably, the SCell may also be modified or released via RRC signaling.

Specifically, for a serving cell, the serving cell may include M downlink carriers and N uplink carriers. M and N are greater than or equal to 0, and M and N are not both equal to 0. For example, in a single-carrier scenario, a serving cell may include one downlink carrier and one uplink carrier. In another example, in a CA scenario, a serving cell may include one downlink carrier and zero to two uplink carriers. In another example, in a supplementary uplink (SUL) scenario, a serving cell may include one downlink carrier, one uplink carrier, and one supplementary uplink carrier. It may be understood that in the SUL scenario, the terminal device may perform uplink communication on both the uplink carrier and the supplementary uplink carrier, or may perform uplink communication on only one of the uplink carrier or the supplementary uplink carrier. This is not limited in embodiments of this application.

7. Downlink/Uplink serving cell: In embodiments of this application, the downlink serving cell is a cell that provides a downlink transmission service for the terminal device, and the uplink serving cell is a cell that provides an uplink transmission service for the terminal device. For example, in a carrier aggregation scenario, a downlink serving cell may be a downlink primary cell/primary downlink cell, or may be a downlink secondary cell/secondary downlink cell; and an uplink serving cell may be an uplink primary cell/primary uplink cell, or may be an uplink secondary cell/secondary uplink cell. The primary downlink serving cell/downlink primary serving cell and the primary uplink serving cell/uplink primary serving cell are cells accessed by the terminal device when the terminal device performs initial access, or are cells specified by the network device or the terminal device in a handover process of the terminal device. The primary downlink serving cell/downlink primary serving cell and the primary uplink serving cell/uplink primary serving cell have different cell identifiers, and the primary downlink serving cell/downlink primary serving cell and the primary uplink serving cell/uplink primary serving cell may be handed over independently. The secondary downlink serving cell/downlink secondary serving cell and the secondary uplink serving cell/uplink secondary serving cell are added via RRC signaling after the terminal device completes initial access, or may be modified or released via RRC signaling. The secondary downlink serving cell/downlink secondary serving cell and the secondary uplink serving cell/uplink secondary serving cell have different cell identifiers, and the secondary downlink serving cell/downlink secondary serving cell and the secondary uplink serving cell/uplink secondary serving cell may be independently added, modified, and released.

Specifically, for a downlink serving cell, the downlink serving cell includes only M downlink carriers, and an uplink serving cell includes only N uplink carriers, where M and N are positive integers. The network device configures, for the terminal device only in the downlink serving cell, a configuration used for transmission on M downlink carriers, for example, a configuration related to a PDSCH, a PDCCH, a CSI-RS, an SSB, and downlink beam management. The base station configures, for the terminal device only in the uplink serving cell, a configuration used for transmission on N uplink carriers, for example, a configuration related to a PUSCH, a PUCCH, an SRS, and uplink beam management.

8. Carrier state: In embodiments of this application, a carrier state may include an active state, an inactive state, a dormant state, and a second state. A name of the second state is not limited in embodiments of this application.

An uplink carrier is used as an example.

When a carrier state of the uplink carrier is the active state, the uplink carrier is activated, and the terminal device supports uplink communication on the uplink carrier. Specifically, behaviors of the terminal device on the uplink carrier in the active state include:

(1) An uplink reference signal may be sent on the uplink carrier, for example, a signal sounding reference signal (SRS), a demodulation reference signal (DMRS), a phase tracking reference signal (PTRS), or a signal carried on a physical random access channel (PRACH).

(2) Channel state information (CSI) may be reported on the uplink carrier.

(3) Data may be sent on the uplink carrier through a physical uplink shared channel (PUSCH), that is, PUSCH transmission may be performed on the uplink carrier.

(4) When a physical uplink control channel (PUCCH) is configured on the uplink carrier, uplink control information may be sent on the PUCCH, that is, PUCCH transmission may be performed on the uplink carrier.

When a carrier state of the uplink carrier is the inactive state, the uplink carrier is deactivated, and the terminal device does not support uplink communication on the uplink carrier. Specifically, behaviors of the terminal device on the uplink carrier in the inactive state includes:

(1) An uplink reference signal, for example, an SRS, a DMRS, a PTRS, or a signal carried on PRACH, is not transmitted on the uplink carrier.

(2) CSI is not reported on the uplink carrier.

(3) Data is not transmitted on the uplink carrier through a PUSCH, that is, PUSCH transmission is not performed on the uplink carrier.

(4) Information is not transmitted on the uplink carrier through a PUCCH, that is, PUCCH transmission is not performed on the uplink carrier. Notably, when the carrier state is the inactive state, even if the PUCCH is configured on the uplink carrier, PUCCH transmission is not performed on the uplink carrier.

When a carrier state of the uplink carrier is the second state, the uplink carrier is activated, and the terminal device does not support uplink communication on the uplink carrier. For example, when the carrier state of the uplink carrier is the second state, there is no active BWP on the uplink carrier, but there is an active BWP on a downlink carrier that belongs to a same cell as the uplink carrier, or when the carrier state of the uplink carrier is the second state, an active BWP on the uplink carrier is a preconfigured BWP. The preconfigured BWP may be protocol defined, or may be configured by the network device for the terminal device via RRC signaling. This is not limited. Alternatively, when the carrier state of the uplink carrier is the second state, there is an active BWP on the uplink carrier, but a quantity of ports or a quantity of channels of the BWP activated by the terminal device on the uplink carrier is 0. Alternatively, when the carrier state of the uplink carrier is the second state, there is an active BWP on the uplink carrier, but a carrier state identifier corresponding to the uplink carrier indicates that the state of the uplink carrier state is the second state. The port includes an uplink antenna port, and the channel is an uplink transmit channel. For example, when a carrier state of the uplink carrier is the second state, behaviors of the terminal device on the uplink carrier include:

(1) An uplink reference signal, for example, an SRS, a DMRS, a PTRS, or a signal carried on PRACH, is not transmitted on the uplink carrier.

(2) CSI is not reported on the uplink carrier.

(3) Data is not transmitted on the uplink carrier through a PUSCH, that is, PUSCH transmission is not performed on the uplink carrier.

(4) Information is not transmitted on the uplink carrier through a PUCCH, that is, PUCCH transmission is not performed on the uplink carrier.

Figures 1B, 2:
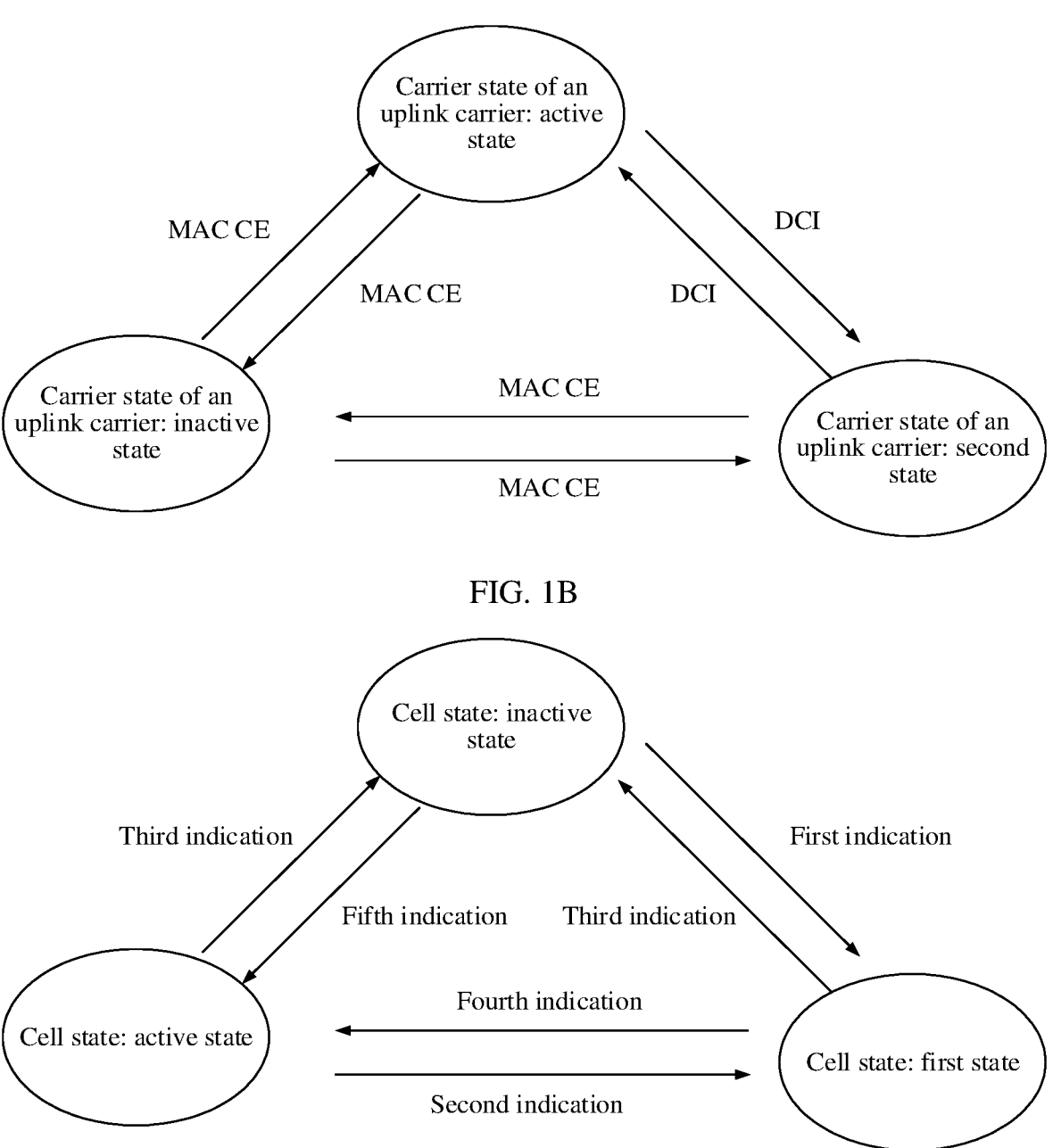
FIG. 1B is a schematic diagram of state switching of a carrier according to an embodiment of this application.
FIG. 2 is a schematic diagram of serving cell state switching according to an embodiment of this application.

It may be understood that, a same carrier may be switched between different carrier states. An uplink carrier is used as an example. For example, FIG. 1B is a schematic diagram of switching a same uplink carrier between carrier states. For example, the network device may indicate, via downlink control information (DCI), the terminal device to switch the carrier state of the uplink carrier from the active state to the second state or from the second state to the active state. Specifically, the DCI may indicate, to the terminal device by indicating a quantity of ports or a quantity of channels of the uplink carrier, whether a carrier state of the uplink carrier configured for the terminal device is switched from the active state to the second state or from the second state to the active state. In an implementation, the DCI may indicate, to the terminal device by indicating that a quantity of ports or a quantity of channels of the uplink carrier is 0, that a carrier state of the uplink carrier configured for the terminal device is switched from the active state to the second state. In another implementation, the DCI may indicate, to the terminal device by indicating that a quantity of ports or a quantity of channels of the uplink carrier is N, that a carrier state of the uplink carrier configured for the terminal device is switched from the second state to the active state, where N is an integer greater than 0. Notably, when a plurality of serving cells are configured for the terminal device, the network device may further indicate, to the terminal device via DCI, carrier states of uplink carriers of the plurality of serving cells configured for the terminal device. In another example, the network device may indicate, via Media Access Control control element (MAC CE) signaling, the terminal device to switch a carrier state of the uplink carrier configured for the terminal device from the active state to the inactive state, or from the inactive state to the first state, or from the inactive state to the second state, or from the second state to the inactive state.

Alternatively, in some other embodiments, the network device may indicate, in a semi-persistent manner, the terminal device to switch the carrier state. For example, the network device may configure one or more time patterns for one uplink carrier via higher layer signaling. The time pattern includes a time unit corresponding to a carrier state of the uplink carrier. For example, the time pattern includes 10 time units, carrier states of the uplink carrier corresponding to first seven time units are the active state, and carrier states of the uplink carrier corresponding to last three time units are the second state. In this case, for an uplink carrier, the terminal device may configure a carrier state of the uplink carrier to the active state based on the time pattern, perform uplink communication on the uplink carrier in the first seven time units, and switch the carrier state of the uplink carrier from the active state to the second state in the last three time units. Alternatively, the time pattern includes a time unit corresponding to a case in which the carrier state of the uplink carrier is the active state, and a time unit that is in the time pattern and that does not correspond to the carrier state of the uplink carrier may be adaptively determined by the network device as the active state or the second state. For example, the time pattern includes 10 time units, a carrier state of the uplink carrier corresponding to first seven time units is the active state, and a carrier state of the uplink carrier corresponding to last three time units depends on implementation performed by the network device.

Further, in some embodiments, when the network device configures a plurality of time patterns for the terminal device via higher layer signaling, the network device may further activate one of the time patterns via physical layer signaling or MAC CE signaling, and the terminal device may determine a carrier state of a corresponding uplink carrier based on the activated time pattern.

In addition, the network device may alternatively uniformly configure one or more time patterns for all activated uplink carriers or configured uplink carriers to indicate carrier states of different uplink carriers in time domain. For example, the terminal device is configured with two uplink carriers: a carrier 1 and a carrier 2. A time pattern uniformly configured by the network device for the carrier 1 and the carrier 2 is shown in FIG. 1A, and includes 10 slots. A carrier state of the carrier 1 corresponding to slots 0 to 3 is the active state, and a carrier state of the carrier 2 is the second state. A carrier state of the carrier 1 corresponding to slots 4 to 6 is the second state, and a carrier state of the carrier 2 corresponding to slots 4 to 6 is the active state. Carrier states of the carrier 1 and the carrier 2 corresponding to slots 7 to 9 are both the active state. In this case, based on the time patterns corresponding to the carrier 1 and the carrier 2, the terminal device configures the carrier state of the carrier 1 to the active state and the carrier state of the carrier 2 to the second state in the slots 0 to 3, configures the carrier state of the carrier 1 to the second state and the carrier 2 to the active state in the slots 4 to 6, configures the carrier state of the carrier 1 to the active state in the slots 7 to 9, and continues maintaining a configuration that the carrier state of the carrier 2 is the active state.

Further, in some embodiments, the network device may configure a periodic time pattern for the uplink carrier. A time pattern of an uplink carrier is used as an example. The terminal device may determine, for the uplink carrier, a carrier state of the uplink carrier based on a periodic time pattern. For example, a periodicity of the time pattern is 10 time units. A carrier state of the uplink carrier corresponding to first seven time units is the active state, and a carrier state of the uplink carrier corresponding to last three time units is the second state. The terminal device may switch the carrier state of the uplink carrier from the second state to the active state every three time units, and switch the carrier state of the uplink carrier from the active state to the second state every seven time units. For example, a periodicity of switching the carrier state of the uplink carrier from the second state to the active state may be the same as a periodicity of transmitting an SRS.

When time patterns of uplink carriers of a plurality of serving cells of the terminal device collide, for example, in a same time unit, M serving cells in N serving cells of the terminal device need to enter the active state, or M serving cells of the terminal device need to send uplink signals, but the terminal device can simultaneously send uplink signals in a maximum of L serving cells, where N is greater than or equal to M, M is greater than or equal to L, and N, M, and L are positive integers, the terminal device may determine, based on priorities of the M serving cells, a serving cell in which uplink sending can be performed. The priorities of the serving cells may be predefined. For example, in the M serving cells, a priority of a PCell is higher than a priority of an SPCell, and the priority of the SPCell is higher than a priority of an SCell. For a plurality of SCells, the network device and/or the terminal device may determine priorities of the secondary cells based on a channel having a transmission requirement. For example, the priorities of the secondary cells in descending order are: a PRACH, a PUCCH/PUSCH carrying HARQ-ACK information and/or an SRS, a PUCCH/PUSCH carrying CSI, a PUSCH not carrying HARQ-ACK information/CSI, and a channel carrying an SRS. In addition, for different secondary cells, if channels are the same, priorities of the secondary cells are determined based on periodicities of carrying data on the channels. For example, the priorities of the secondary cells in descending order are: a priority of a secondary cell corresponding to an aperiodic channel, a priority of a secondary cell corresponding to a semi-permanent channel, and a priority of a secondary cell corresponding to a periodic channel. In addition, in some embodiments, when a serving cell includes an uplink carrier and a supplementary uplink carrier, a priority of the uplink carrier is higher than a priority of the supplementary uplink carrier.

Alternatively, in still some other embodiments, the network device may implicitly indicate state switching of an uplink carrier based on uplink data scheduling. For example, in a same time unit, the network device schedules the terminal device to send a PUSCH on an uplink carrier 1 through one port, and send a PUSCH on the uplink carrier 2 through one port. In this case, the uplink carrier 1 and the uplink carrier 2 are in the active state, and another activated uplink carrier is in the second state.

8. Serving cell state: In embodiments of this application, the serving cell state is a cell state of the serving cell, and may include an active state, an inactive state, a dormant state, and a first state. Notably, in embodiments of this application, the first state may also be referred to as an X state, another state, or the like, and is a cell state other than the active state, the inactive state, and the dormant state, or is an active state to which an additional limitation is added. A name of the first state is not limited in embodiments of this application.

When the serving cell state is the active state, if an uplink carrier and a downlink carrier are configured for the serving cell, the uplink carrier of the serving cell supports uplink communication, and the downlink carrier of a serving cell supports downlink communication. In other words, when the serving cell state is the active state, the terminal device can perform communication on the uplink carrier and the downlink carrier. For example, when the serving cell state is the active state, that the terminal device can perform communication on the uplink carrier may be understood as that the uplink carrier is activated, and that the terminal device can perform communication on the downlink carrier may be understood as that the downlink carrier is activated. In another example, when the serving cell state is the active state, a carrier state of the uplink carrier of the serving cell is the active state, and a carrier state of the downlink carrier of the serving cell is the active state.

Specifically, when the serving cell state is the active state, behaviors of the terminal device in the serving cell may include:

(1) An uplink reference signal, for example, an SRS, a DMRS, a PTRS, or a signal carried on a PRACH, may be sent in the serving cell.

(2) CSI may be reported in the serving cell, that is, CSI of the serving cell is reported.

(3) A physical downlink control channel (PDCCH) may be monitored in the serving cell, that is, a PDCCH of the serving cell may be monitored.

(4) For example, a PDCCH, for example, with cross-carrier scheduling, a dormant state indication, and the like, for the serving cell may be monitored.

(5) Data may be sent on a physical uplink shared channel (PUSCH) of the serving cell, that is, PUSCH transmission may be performed in the serving cell.

(6) When a physical uplink control channel (PUCCH) is configured in the serving cell, uplink control information may be sent on the PUCCH, that is, PUCCH transmission may be performed in the serving cell.

(7) Data may be received a physical downlink shared channel (PDSCH) of the serving cell, that is, PDSCH transmission may be performed in the serving cell.

(8) A downlink reference signal, for example, a CSI-RS, a DMRS, a PTRS, a TRS, or a synchronization signal block (SSB), may be received in the serving cell.

When the serving cell state is the inactive state, an uplink carrier of the serving cell does not support uplink communication, and a downlink carrier of the serving cell does not support downlink communication. In other words, when the serving cell state is the inactive state, the terminal device cannot perform communication on the uplink carrier and the downlink carrier. For example, when the serving cell state is the inactive state, that the terminal device cannot perform communication on the uplink carrier may be understood as that all uplink carriers are deactivated, and that the terminal device cannot perform communication on the downlink carrier may be understood as that downlink carriers are deactivated. In another example, when the serving cell state is the inactive state, a carrier state of the uplink carrier of the serving cell is the inactive state, and a carrier state of the downlink carrier of the serving cell is the inactive state.

Specifically, when the serving cell state is the inactive state, behaviors of the terminal device in the serving cell may include:

(1) An uplink reference signal, for example, an SRS, a DMRS, a PTRS, or a signal carried on a PRACH, is not sent in the serving cell.

(2) CSI is not reported in the serving cell, that is, CSI of the serving cell is not reported.

(3) A PDCCH is not monitored in the serving cell, that is, a PDCCH of the serving cell is not monitored.

(4) For example, a PDCCH, for example, with cross-carrier scheduling, dormant state indication, and the like, for the serving cell is not monitored.

(5) Data is not sent on a PUSCH of the serving cell, that is, PUSCH transmission is not performed in the serving cell.

(6) PUCCH transmission is not performed in the serving cell.

(7) Data is not received on a PDSCH of the serving cell, that is, PDSCH transmission is not performed in the serving cell.

(8) A downlink reference signal, for example, a CSI-RS, a DMRS, a PTRS, a TRS, or a synchronization signal block (SSB), is not received in the serving cell.

When the serving cell state is the dormant state, an uplink carrier of the serving cell does not support uplink communication, and a downlink carrier of the serving cell may support some downlink communication. Behaviors of the terminal device in the serving cell when the serving cell is in the dormant state include:

(1) CSI measurement may be performed in the serving cell, that is, measurement is performed on a CSI-RS sent in the serving cell.

(2) An uplink reference signal, for example, an SRS, a DMRS, a PTRS, or a signal carried on PRACH, is not transmitted in the serving cell.

(3) CSI is not reported in the serving cell.

(4) Data is not transmitted in the serving cell through a PUSCH, that is, PUSCH transmission is not performed in the serving cell.

(5) Uplink control information is not transmitted in the serving cell through a PUCCH, that is, PUCCH transmission is not performed in the serving cell.

(6) A physical downlink control channel (PDCCH) is not monitored in the serving cell, that is, a PDCCH of the serving cell is not monitored.

(7) A PDCCH, for example, with dormant state indication, for the serving cell may be monitored.

When the serving cell state is the first state, a downlink carrier of a serving cell supports downlink communication, and an uplink carrier of the serving cell does not support uplink communication. In other words, when the serving cell state is the first state, the terminal device may perform communication on the downlink carrier, but cannot perform communication on the uplink carrier.

For example, when the serving cell state is the first state, the downlink carrier of the serving cell is activated, and the uplink carrier of the serving cell is deactivated. For example, when the serving cell state is the first state, a carrier state of the uplink carrier of the serving cell is the inactive state, and a carrier state of the downlink carrier of the serving cell is the active state.

In another example, when the serving cell state is the first state, the downlink carrier of the serving cell is activated, and the uplink carrier of the serving cell is activated, but a quantity of ports and/or a quantity of channels of the uplink carrier are or is 0.

In another example, when the serving cell state is the first state, the downlink carrier of the serving cell is activated, and the uplink carrier of the serving cell is activated, but an active BWP on the uplink carrier is a preconfigured BWP, or an active BWP on the downlink carrier is a preconfigured BWP.

In another example, when the serving cell state is the first state, the downlink carrier of the serving cell is activated, and the uplink carrier of the serving cell is activated. However, a cell state identifier configured by the network device for a cell whose serving cell state is the first state is different from a cell state identifier configured by the network device for a cell whose cell state is the active state. For example, a cell state identifier configured by the network device for a serving cell whose serving cell state is the first state is a first cell state identifier (for example, 1), and a cell state identifier configured by the network device for a serving cell whose serving cell state is the active state is a second cell state identifier (for example, 0).

Particularly, when one serving cell of the terminal device includes a plurality of uplink carriers, or a plurality of uplink carriers are configured in one serving cell of the terminal device, if at least one of the plurality of uplink carriers can be used for uplink communication, a serving cell state of the terminal device is the active state.

In another example, when the serving cell state is the first state, a carrier state of the downlink carrier of the serving cell is the active state, and a state of the uplink carrier of the serving cell is the second state. For that the carrier state of the uplink carrier is the second state, refer to related descriptions of the second state in the carrier states. Details are not described herein again.

In some embodiments, when the serving cell state is the first state, behaviors of the terminal device in the serving cell may include:

(1) CSI measurement is performed in the serving cell, that is, measurement is performed on a CSI-RS sent in the serving cell.

(2) A PDCCH is monitored in the serving cell, that is, a PDCCH of the serving cell may be monitored.

(3) For example, a PDCCH, for example, with cross-carrier scheduling, dormant state indication, and the like, for the serving cell is monitored.

(4) Data is received on a PDSCH of the serving cell, that is, PDSCH transmission is received in the serving cell.

(5) A downlink reference signal, for example, a CSI-RS, a DMRS, a PTRS, a TRS, or an SSB, is received in the serving cell.

(6) A signal carried on a PRACH, a PUCCH, or a PUSCH, an uplink DMRS, an SRS, or an uplink PTRS is not sent in the serving cell.

Notably, options (1), (4), (5), and (6) are optional, and one or more of options (2) and (3) are mandatory.

In embodiments of this application, a same serving cell may be switched between different serving cell states. For example, the terminal device may perform serving cell state switching based on a serving cell state switching indication sent by the network device, as shown in FIG. 2. In an implementation, the terminal device switches the serving cell state from the inactive state to the first state based on a first indication. It may be understood that for switching between the active state, the inactive state, and the dormant state, refer to related descriptions in the prior art. Details are not described herein again. For switching between the dormant state and the first state, for example, that the terminal device switches the serving cell state between the dormant state and the first state may be implemented in the following manner: first switching a carrier state from the dormant state to the active state, and then switching the carrier state from the active state to the first state. In another example, that the terminal device switches the serving cell state from the first state to the dormant state may be triggered via DCI, and an implementation method is similar to that of switching the serving cell state from the active state to the dormant state. In embodiments of this application, switching between the active state and the first state and switching between the inactive state and the first state are mainly described.

Embodiments of this application may be applied to communication systems such as an LTE communication system and an NR communication system. FIG. 3 is a schematic diagram of a network architecture of a communication system according to an embodiment of this application. The communication system includes a terminal device and a network device. In embodiments of this application, the network device and the terminal device may be deployed on land, including indoor or outdoor, handheld, or vehicle-mounted deployment; may be deployed on the water; or may be deployed on an airplane, a balloon, and an artificial satellite in the air. Deployment scenarios of the network device and the terminal device are not limited in embodiments of this application.

It can be understood that, in embodiments of this application, the communication between the network device and the terminal device and the communication between the terminal devices may be performed over a licensed spectrum, an unlicensed spectrum, or both a licensed spectrum and an unlicensed spectrum. This is not limited. The communication between the network device and the terminal device and the communication between the terminal devices may be performed over a sub-6 gigahertz (GHz) spectrum, a spectrum above 6 GHz, or both a sub-6 GHz spectrum and a spectrum above 6 GHz. That is, embodiments of this application are applicable to both a low-frequency scenario (for example, sub 6G) and a high-frequency scenario (6G or higher). Embodiments of this application may be further applied to a scenario in which a plurality of serving cells or carriers are configured for the terminal device, for example, a CA scenario, a dual-connectivity (DC) scenario and an SUL scenario, or a CA-SUL combination scenario.

The network architecture of the communication system shown in FIG. 3 is merely an example, and does not constitute a limitation on a network architecture of a communication system in embodiments of this application. A quantity of network devices and a quantity of terminal devices in the communication system are not limited in embodiments of this application. For example, when the communication system in this embodiment of this application includes a plurality of network devices, coordinated multipoint communication may be performed between a network device and a network device. For example, the communication system includes a plurality of macro base stations and a plurality of micro base stations. Coordinated multipoint communication may be performed between the macro base stations, between the micro base stations, or between the macro base station and the micro base station.

The following describes in detail the method in embodiments of this application with reference to the accompanying drawings.

For example, FIG. 4 is a flowchart of a cell state switching method according to an embodiment of this application. The method specifically includes the following steps.

401. A network device sends a first instruction to a terminal device. The first instruction indicates to switch a serving cell state of the terminal device to a first state or from a first state. When the serving cell state is the first state, a downlink carrier of a serving cell supports downlink communication, and an uplink carrier of the serving cell does not support uplink communication. For details, refer to the foregoing related descriptions about the serving cell state. Details are not described herein again.

In some embodiments, the network device may send the first instruction to the terminal device, for example, may send the first instruction periodically and/or as triggered by an event. For example, the network device may configure N serving cells for the terminal device. If after the N serving cells are activated, it is difficult for a maximum quantity of ports and/or a maximum quantity of channels supported by uplink communication of the terminal device to meet a requirement for simultaneous transmission of uplink carriers of the N serving cells, M serving cells in the N serving cells may be initialized as serving cells whose serving cell state is an active state, and the remaining N–M serving cells may be initialized as serving cells whose serving cell state is the first state. Then, according to transmission requirements of the N serving cells, cell states of the M serving cells in the serving cells are switched to the first state, and/or cell states of the N–M serving cells in the serving cells are switched from the first state. Notably, a quantity N of serving cells configured by the network device for the terminal device and a quantity M of serving cells activated for the terminal device do not exceed a maximum capability supported by the terminal device, and $N \geq M > 0$.

For example, the network device may initialize and configure the cell states of the N serving cells based on a priority sequence of the N serving cells, and perform cell state switching.

For example, the first instruction may be carried in DCI or MAC CE signaling and sent by the network device to the terminal device. The first instruction may be cell-level signaling, terminal device-specific signaling, or signaling of a terminal group set. This is not limited. An object entering the first state or being switched from the first state as indicated by the first instruction may be a cell or a carrier, or may be a cell group or a carrier group.

402. The terminal device receives the first instruction from the network device, and switches a serving cell state based on the first instruction.

The following specifically describes the cell state switching method in embodiments of this application with reference to the first state.

Embodiment 1: When a serving cell state is a first state, an uplink carrier of a serving cell is deactivated, and a downlink carrier of the serving cell is activated.

In this case, in some embodiments, the first instruction may be carrier activation or deactivation signaling. For example, when the serving cell state of the terminal device is an active state, if a first instruction sent by the network device is received, where the first instruction indicates to deactivate the uplink carrier, the terminal device deactivates the uplink carrier of the serving cell based on the first instruction. Therefore, the serving cell state is switched from the active state to the first state. In this case, the first instruction does not indicate state switching of the downlink carrier, that is, a state of the downlink carrier remains unchanged. In another example, when the serving cell state is the first state, if the terminal device receives a first instruction sent by the network device, where the first instruction indicates to activate the uplink carrier, the terminal device activates the uplink carrier of the serving cell based on the first instruction. Therefore, the serving cell state is switched from the first state to the active state. In this case, the first instruction does not indicate a state switching of the downlink carrier, that is, the state of the downlink carrier remains unchanged. In still another example, when the serving cell state is the first state, if the terminal device receives a first instruction sent by the network device, where the first instruction indicates to deactivate the downlink carrier, the terminal device deactivates the downlink carrier of the serving cell based on the first instruction. In this case, the first instruction does not indicate state switching of the uplink carrier, that is, a state of the uplink carrier remains unchanged. Therefore, the serving cell state is switched from the first state to the inactive state. In yet another example, when the serving cell state of the terminal device is an inactive state, if a first instruction sent by the network device is received, where the first instruction indicates to activate the downlink carrier, the terminal device activates the downlink carrier of the serving cell based on the first instruction, thereby switching the serving cell state from the inactive state to the first state. In this case, the first instruction does not indicate state switching of the uplink carrier, that is, a state of the uplink carrier remains unchanged. In a case, for example, the first instruction is for activating an uplink carrier in the serving cell; in another example, the first instruction is for activating a downlink carrier in the serving cell. In another case, if the serving cell includes a plurality of uplink carriers or downlink carriers, for example, the first instruction is for activating all uplink carriers in the serving cell; for another example, the first instruction is for activating all downlink carriers in the serving cell. In this manner, independent activation or deactivation of uplink/downlink carriers can be flexibly implemented, to match different uplink/downlink terminal capabilities, uplink/downlink channels, and uplink/downlink remaining resources respectively.

Activation or deactivation of a carrier is used as an example above. Activation or deactivation of a serving cell is similar to this. The first instruction may be activation or deactivation signaling of the serving cell. For example, when the terminal device receives a first instruction sent by the network device, where the first instruction indicates to deactivate an uplink serving cell 1, the terminal device deactivates the uplink serving cell 1 based on the first instruction. In this case, the first instruction does not indicate state switching of a downlink serving cell, that is, a state of the downlink serving cell remains unchanged. In another example, if the terminal device receives a first instruction sent by the network device, where the first instruction indicates to activate an uplink serving cell 1, the terminal device activates the uplink serving cell 1 based on the first instruction. In this case, the first instruction does not indicate state switching of a downlink serving cell, that is, a state of the downlink serving cell remains unchanged. In still another example, when the terminal device receives a first instruction sent by the network device, where the first instruction indicates to deactivate a downlink serving cell 1, the terminal device deactivates the downlink serving cell 1 based on the first instruction. In this case, the first instruction does not indicate state switching of an uplink serving cell, that is, a state of the uplink serving cell remains unchanged. In another example, if the terminal device receives a first instruction sent by the network device, where the first instruction indicates to activate a downlink serving cell 1, the terminal device activates the downlink serving cell 1 based on the first instruction. In this case, the first instruction does not indicate state switching of an uplink serving cell, that is, a state of the uplink serving cell remains unchanged. In a case, for example, the first instruction is for activating an uplink carrier in the uplink serving cell; in another example, the first instruction is for activating a downlink carrier in the downlink serving cell. In another case, if the uplink serving cell includes a plurality of uplink carriers or the downlink serving cell includes a plurality of downlink carriers, for example, the first instruction is for activating all uplink carriers in the uplink serving cell; for another example, the first instruction is for activating all downlink carriers in the downlink serving cell. In this manner, independent activation or deactivation of uplink/downlink serving cell can be flexibly implemented, to match different uplink/downlink terminal capabilities, uplink/downlink channels, and uplink/downlink remaining resources respectively.

Notably, when N serving cells are configured for the terminal device, activation or deactivation signaling for carriers of a plurality of serving cells configured by the network device for the terminal device may be indicated to the terminal device via RRC signaling, DCI, or MAC CE signaling. The RRC signaling, the DCI, or the MAC CE signaling may be sent to the terminal device on any activated downlink carrier. The activated downlink carrier may be a downlink carrier of a PCell, an SCell, or a PSCell. This is not limited herein.

In some other embodiments, the first instruction may alternatively be cell-level signaling. In this case, at least one bit in the first instruction indicates a current serving cell state of the terminal device, and the at least one bit in the first instruction indicates a serving cell state to which the terminal device needs to be switched. For example, when the current serving cell state of the terminal device is an active state, if a first instruction sent by the network device is received, where the first instruction is enable signaling for switching a cell state from the active state to the first state, the terminal device switches the serving cell state from the active state to the first state based on the first instruction. In another example, when the current serving cell state of the terminal device is the first state, if a first instruction sent by the network device is received, where the first instruction is cell state activation signaling, the terminal device switches the serving cell state from the first state to an active state based on the first instruction. In still another example, when the current serving cell state of the terminal device is an inactive state, if a first instruction sent by the network device is received, where the first instruction is enable signaling for switching the cell state from the inactive state to the first state, the terminal device switches the serving cell state from the inactive state to the first state based on the first instruction. In still another example, when the current serving cell state of the terminal device is the first state, if a first instruction sent by the network device is received, where the first instruction is cell state deactivation signaling, the terminal device switches the serving cell state from the first state to an inactive state based on the first instruction.

Embodiment 2: When a serving cell state is a first state, a downlink carrier of a serving cell is activated, and an uplink carrier of the serving cell is activated, but a quantity of ports and/or a quantity of channels of the uplink carrier are or is 0. The following uses a quantity of ports as an example. For a quantity of channels, refer to related descriptions of the quantity of ports.

In this case, for example, when the serving cell state of the terminal device is an active state, if a first instruction sent by the network device is received, where the first instruction indicates to set a quantity of ports of an uplink carrier of a serving cell to 0, the terminal device switches the serving cell state from the active state to the first state based on the first instruction. For example, that the first instruction indicates to set the quantity of ports of the uplink carrier of the serving cell to 0 may be implemented in the following manner: including, in cell activation signaling, an indication indicating that the quantity of ports of the uplink carrier of the serving cell is 0.

In another example, when the serving cell state of the terminal device is the first state, if a first instruction sent by the network device is received, where the first instruction indicates to set a quantity of ports of an uplink carrier of a serving cell to P, $0 < P \leq M$, P is a positive integer, and M is a maximum quantity of ports supported by uplink communication of the terminal device, the terminal device switches the serving cell state from the first state to an active state based on the first instruction. For example, that the first instruction indicates to set the quantity of ports of the uplink carrier of the serving cell to P may be implemented in the following manner: including the quantity of ports of the uplink carrier of the serving cell in cell activation signaling, or including, in cell activation signaling, an indication indicating that the quantity of ports of the uplink carrier of the serving cell is not 0. It may be understood that the network device may semi-persistently or dynamically send, to the terminal device, cell activation signaling carrying an indication indicating that the quantity of ports of the uplink carrier of the serving cell is P, or the cell activation signaling carries the indication indicating that the quantity of ports of the uplink carrier of the serving cell is not 0.

In another example, when the serving cell state of the terminal device is an inactive state, if a first instruction sent by the network device is received, where the first instruction indicates to set a quantity of ports of an uplink carrier of a serving cell to 0, the terminal device switches the serving cell state from the inactive state to the first state based on the first instruction. For example, that the first instruction indicates to set the quantity of ports of the uplink carrier of the serving cell to 0 may be implemented in the following manner: including the quantity of ports of the uplink carrier of the serving cell in cell activation signaling, or including, in cell activation signaling, an indication indicating that the quantity of ports of the uplink carrier of the serving cell is 0. For example, the cell activation signaling in embodiments of this application may be RRC signaling, MAC CE signaling, DCI, or the like. This is not limited.

In another example, when the serving cell state of the terminal device is the first state, if a first instruction sent by the network device is received, where the first instruction indicates deactivate a serving cell, the terminal device switches the serving cell state from the first state to an inactive state based on the first instruction.

Embodiment 3: When a serving cell state is a first state, a downlink carrier of a serving cell is activated, an uplink carrier of the serving cell is activated, but an active BWP on the uplink carrier is a preconfigured BWP. Alternatively, when a serving cell state is a first state, a downlink carrier of a serving cell is activated, an uplink carrier of the serving cell is activated, but an active BWP on the downlink carrier is a preconfigured BWP. For example, when the active BWP on the uplink carrier is a preconfigured BWP, a quantity of ports and/or a quantity of channels of the preconfigured BWP are or is 0. In another example, when the active BWP on the downlink carrier is a preconfigured BWP, a quantity of ports and/or a quantity of channels of the uplink carrier are or is 0. For example, the network device may indicate the preconfigured BWP to the terminal device via RRC signaling. For example, the RRC signaling includes a BWP ID of the preconfigured BWP. Alternatively, the preconfigured BWP on the uplink carrier of the serving cell may be protocol predefined.

An example in which the active BWP on the uplink carrier is a preconfigured BWP is used. In this case, for example, when the serving cell state of the terminal device is an active state, if a first instruction sent by the network device is received, where the first instruction indicates to activate a preconfigured BWP on the uplink carrier of the serving cell, the terminal device switches the serving cell state from the active state to the first state based on the first instruction. In another example, when the serving cell state of the terminal device is the first state, if a first instruction sent by the network device is received, where the first instruction indicates to activate a BWP whose quantity of ports is Q on the uplink carrier of the serving cell, $0<Q\leq M$, and M is a maximum quantity of ports supported by uplink communication of the terminal device, the terminal device switches the preconfigured BWP to the BWP whose quantity of ports is Q on the uplink carrier (that is, a BWP whose quantity of ports is not 0 on the uplink carrier), thereby switching the serving cell state from the first state to an active state based on the first instruction. Notably, in embodiments of this application, a BWP switching mechanism in the conventional technology may be reused for BWP switching, and switching is performed based on a BWP ID. Details are not described herein again.

For example, the network device may dynamically or semi-persistently send a first instruction to the terminal device for BWP switching, so as to implement switching between the active state and the first state in the serving cell state.

For example, in a scenario in which a plurality of serving cells are configured for the terminal device, first instructions of the plurality of serving cells may be carried in one piece of signaling and sent to the terminal device, or a first instruction of each serving cell may be separately sent to the terminal device. For example, serving cells configured for the terminal device include a cell 1, a cell 2, and a cell 3. Serving cell states of the cell 1 and the cell 3 are the active state, a serving cell state of the cell 2 is the first state, 0 indicates to activate a preconfigured BWP on an uplink carrier of the serving cell, and 1 indicates to activate a non-preconfigured BWP on the uplink carrier of the serving cell. If signaling received by the terminal device is 011, the terminal device switches the cell state of the cell 1 from the active state to the first state, switches the cell state of the cell 2 from the first state to the active state, and keeps the cell state of the cell 3 unchanged in the active state.

Notably, for switching between the inactive state and the first state in the serving cell state in Embodiment 3, refer to related descriptions of switching between the inactive state and the first state in Embodiment 2. Details are not described herein again.

Embodiment 4: When a serving cell state is a first state, a downlink carrier of the serving cell is activated, and an uplink carrier of the serving cell is activated, but a cell state identifier is a first cell state identifier, where the first cell state identifier identifies the first state.

In this case, for example, when the serving cell state of the terminal device is an active state, if a first instruction sent by the network device is received, where the first instruction indicates to configure the cell state identifier of the serving cell as the first cell state identifier, the terminal device switches the serving cell state from the active state to the first state based on the first instruction. In another example, when the serving cell state of the terminal device is an inactive state, if a first instruction sent by the network device is received, where the first instruction indicates to configure the cell state identifier of the serving cell as the first cell state identifier, the terminal device switches the serving cell state from the inactive state to the first state based on the first instruction. In still another example, when the serving cell state of the terminal device is the first state, if a first instruction sent by the network device is received, where the first instruction indicates to configure the cell state identifier of the serving cell as a second cell state identifier, the terminal device switches the serving cell state from the first state to an active state based on the first instruction. The second cell state identifier identifies the active state. In yet another example, when the serving cell state of the terminal device is the first state, if a first instruction sent by the network device is received, where the first instruction indicates to configure the cell state identifier of the serving cell as a third cell state identifier, the terminal device switches the serving cell state from the first state to an inactive state based on the first instruction. The third cell state identifier identifies the inactive state. In an implementation, the first cell state identifier is 11, the second cell state identifier is 10, and the third cell state identifier is 01.

For example, the network device may dynamically or semi-persistently send a first instruction to the terminal device for configuring a cell state identifier. Notably, in a scenario in which a plurality of serving cells are configured for the terminal device, first instructions of the plurality of serving cells may be carried in one piece of signaling and sent to the terminal device, or a first instruction of each serving cell may be separately sent to the terminal device.

Embodiment 5: When a serving cell state is a first state, a carrier state of a downlink carrier of the serving cell is an active state, and a carrier state of an uplink carrier of the serving cell is a second state, specific implementation of a first instruction is related to specific implementation when the carrier state of the uplink carrier is the second state. For example, for switching of the serving cell state in Embodiment 5, refer to the description of switching of the serving cell state in Embodiment 1 to Embodiment 4. Details are not described herein again.

Notably, in embodiments of this application, the foregoing behaviors of the terminal device when the serving cell state is the first state may be used in combination with each other, or may be used independently. This is not limited. For example, if Embodiment 3 and Embodiment 4 are combined with each other, the first instruction may indicate an active BWP on a carrier and a cell state identifier.

Notably, in all of the foregoing five descriptions about that the serving cell state is the first state, a downlink carrier is included. When a serving cell does not include a downlink carrier or no downlink carrier is configured in a serving cell, the foregoing descriptions about that the serving cell state is the first state may not include descriptions about an activated downlink carrier.

In some other embodiments, the terminal device obtains terminal capability information, and the terminal device reports the capability information to the network device. The capability information includes a band supported by the terminal device, and a maximum quantity of channels and/or a maximum quantity of ports and/or a maximum quantity of antennas supported on the band supported by the terminal device. This helps the network device configure a corresponding quantity of channels and/or a corresponding quantity of ports and/or a corresponding quantity of antennas for an uplink carrier of a serving cell configured for the terminal device. Further, the capability information reported by the terminal device to the network device may further include a maximum quantity of ports and/or a maximum quantity of channels and/or a maximum quantity of antennas supported by uplink communication of the terminal device. Further, the capability information reported by the terminal device to the network device may further include a maximum quantity of ports and/or a maximum quantity of channels and/or a maximum quantity of antennas supported by downlink communication of the terminal device.

Optionally, the capability reported by the terminal device includes at least one of the following:

1. a simultaneously configurable band/CC combination, or a quantity M of simultaneously configurable bands/CCs, or a total bandwidth or bandwidth combination of simultaneously configurable bands/CCs, or a simultaneously configurable serving cell combination;

2. a simultaneously activatable band/CC combination, or a quantity K of simultaneously activatable bands/CCs, or a total bandwidth or bandwidth combination of simultaneously activatable bands/CCs, or a simultaneously activatable serving cell combination;

3. a simultaneously or concurrently transmittable band/CC combination, or a quantity m of simultaneously or concurrently transmittable bands/CCs, or a total bandwidth or a bandwidth combination of simultaneously or concurrently transmittable bands/CCs, or a simultaneously or concurrently transmittable serving cell combination; and 4. a quickly switchable band/CC combination, a quantity L of quickly switchable band/CC sets, or a quickly switchable serving cell combination.

The terminal device may independently report the foregoing reported capabilities, and the capabilities are decoupled from each other, that is, different terminals correspond to a same capability or different capabilities. For one capability, an uplink capability and a downlink capability that correspond to the capability are also decoupled from each other, that is, only one of the uplink capability or the downlink capability or both of the uplink capability and the downlink capability may be reported. The uplink capability and the downlink capability may also be the same or different. For example, using uplink carrier capabilities as an example. M≥K≥L≥m, that is, a quantity of uplink carriers that can be configured for the terminal device is greater than or equal to a quantity of simultaneously activatable uplink carriers, the quantity of simultaneously activatable uplink carriers is greater than or equal to a quantity of quickly switchable uplink carriers, and the quantity of quickly switchable uplink carriers is greater than or equal to a quantity of simultaneously transmittable uplink carriers. The base station may indicate, via signaling such as RRC, MAC CE, or DCI, a user to perform fast carrier switching. The user sends an uplink data channel, uplink control information, an uplink random access channel, or an uplink reference signal, that is, a PUSCH, a PUCCH, a PRACH, an SRS, a DMRS, or the like, on a band/CC/serving cell in an uplink band/CC/serving cell combination that can be quickly switched or simultaneously transmitted. For example, an uplink capability is used as an example. A simultaneously activatable uplink band combination reported by the terminal device is a subset/full set of a simultaneously configurable uplink band combination, and/or a simultaneously transmittable uplink band combination reported by the terminal device is a subset/full set of a simultaneously activatable uplink band combination. For example, an uplink capability is used as an example. A total bandwidth of simultaneously activatable uplink bands/CCs reported by the terminal device is less than or equal to a total bandwidth of uplink simultaneously configurable bands/CCs, and/or a total bandwidth of simultaneously transmittable uplink bands/CCs reported by the terminal device is less than or equal to a total bandwidth of simultaneously activatable uplink bands/CCs. Similarly, for downlink carrier capabilities, M K L m, that is, a quantity of downlink carriers that can be configured for the terminal device is greater than or equal to a quantity of simultaneously activatable downlink carriers, the quantity of simultaneously activatable downlink carriers is greater than or equal to a quantity of quickly switchable downlink carriers, and the quantity of quickly switchable downlink carriers is greater than or equal to a quantity of simultaneously transmittable downlink carriers. The base station may indicate, via signaling such as RRC, MAC CE, or DCI, a user to perform fast carrier switching. The user receives a downlink data channel, downlink control information, a downlink synchronization channel, or a downlink reference signal, that is, a PDSCH, a PDCCH, an SSB, a CSI-RS, a DMRS, or the like, on a band/CC/serving cell in a downlink band/CC/serving cell combination that can be quickly switched or simultaneously transmitted. For example, a downlink capability is used as an example. A simultaneously activatable downlink band combination reported by the terminal device is a subset/full set of a simultaneously configurable downlink band combination, and/or a simultaneously receivable downlink band combination reported by the terminal device is a subset/full set of a simultaneously activatable downlink band combination. For example, a downlink capability is used as an example. A total bandwidth of simultaneously activatable downlink bands/CCs reported by the terminal device is less than or equal to a total bandwidth of downlink simultaneously configurable bands/CCs, and/or a total bandwidth of simultaneously receivable downlink bands/CCs reported by the terminal device is less than or equal to a total bandwidth of simultaneously activatable downlink bands/CCs. In configurable M bands/CCs, an uplink carrier and a downlink carrier may be flexibly paired without using a same band. For example, a serving cell includes an uplink whose carrier frequency is 1.8 G and a downlink whose carrier frequency is 700 MHz. In L switchable band/CC combinations, the network device may flexibly select an uplink carrier or a downlink carrier based on channel measurement results and resource load statuses of different uplink carriers. In some possible examples, the terminal device reports a total quantity of receive and/or transmit channels and/or a quantity of switchable channels of the terminal, for example, reports which channels and/or which quantity of channels can be switched to each other in which band/CC combinations.

For example, an uplink capability is used as an example. The terminal device reports only two of the foregoing capabilities, that is, reports a first uplink band/CC combination and a second uplink band/CC combination. The first uplink band/CC combination is a simultaneously configurable band/CC combination. The second uplink band/CC combination is simultaneously activatable band/CC combination or a simultaneously transmittable band/CC combination. Optionally, the second combination is a subset of the first combination, or a quantity of bands/CCs in the first combination is greater than a quantity of bands/CCs in the second combination, that is, M>K=m. In this way, a base station may set a quantity of uplink carriers/uplink bands for the terminal device based on the reported capability, where the quantity is less than or equal to M, and then dynamically select, via RRC signaling, MAC CE signaling, or DCI signaling, one or more carriers from the configured carriers for quick activation/deactivation for the uplink carrier, thereby ensuring that a quantity of active carriers at a same moment is less than or equal to K, so that the terminal device can quickly switch between M different uplink carriers, thereby more efficiently using resources of the M uplink carriers based on a current channel status and a service characteristic. This avoids a latency caused by performing uplink carrier switching via RRC carrier reconfiguration signaling. If a UE further reports a total quantity of channels and/or which channels and/or what quantity of channels in which bands/CC combinations can be switched to which other, the capability needs to be considered in the foregoing switching.

For example, an uplink is used as an example. The terminal device reports only two of the foregoing capabilities, that is, reports a first uplink band/CC combination and a second uplink band/CC combination. The first uplink band/CC combination is a simultaneously configurable band/CC combination or is a simultaneously activatable band/CC combination. The second uplink band/CC combination is a simultaneously transmittable band/CC combination. Optionally, the second combination is a subset of the first combination, or a quantity of bands/CCs in the first combination is greater than a quantity of bands/CCs in the second combination, that is, M=K>m. In this way, the base station may configure and activate a quantity of uplink carriers/uplink bands for the terminal device based on the reported capability, where the quantity is less than or equal to M, and then dynamically select, via DCI signaling, one or more carriers from the configured or activated carriers for switching, thereby ensuring that a quantity of transmitted carriers at a same moment is less than or equal to m, so that the terminal device can quickly switch between M different uplink carriers, thereby more efficiently using resources of the M uplink carriers based on a current channel status and a service characteristic. This avoids a latency caused by performing uplink carrier switching via RRC carrier reconfiguration signaling or a latency caused by activating/deactivating an uplink carrier via MAC CE signaling. If a UE further reports a total quantity of channels and/or which channels and/or what quantity of channels in which bands/CC combinations can be switched to which other, the capability needs to be considered in the foregoing switching.

For example, an uplink is used as an example. The terminal device reports only three of the foregoing capabilities, that is, reports a first uplink band/CC combination, a second uplink band/CC combination, and a third uplink band/CC combination. The first uplink band/CC combination is a simultaneously configurable band/CC combination. The second uplink band/CC combination is simultaneously activatable band/CC combination. The third uplink band/CC combination is a simultaneously transmittable band/CC combination. Optionally, the third combination is a subset of the second combination, and the second combination is a subset of the first combination, or a quantity of bands/CCs in the first combination is greater than a quantity of bands/CCs in the second combination, and a quantity of bands/CCs in the second combination is greater than a quantity of bands/CCs in the third combination, that is, M>K>m. In this way, the base station may set a quantity of uplink carriers/uplink bands for the terminal device based on the reported capability, where the quantity is less than or equal to M, then activate a quantity of uplink carriers/uplink bands for the terminal device based on the reported capability, where the quantity is less than or equal to M, and then switch an uplink carrier via DCI signaling, thereby ensuring that a quantity of scheduled carriers at a same moment is less than or equal to m, so that the terminal device can quickly switch between M different uplink carriers, thereby more efficiently using resources of the M uplink carriers based on a current channel status and a service characteristic. This avoids a latency caused by performing uplink carrier switching via RRC carrier reconfiguration signaling or a latency caused by activating/deactivating an uplink carrier via MAC CE signaling. If a UE further reports a total quantity of channels and/or which channels and/or what quantity of channels in which bands/CC combinations can be switched to which other, the capability needs to be considered in the foregoing switching.

A quantity M of bands/CCs or a total bandwidth or a bandwidth combination of bands/CCs is similar to this, and details are not described again.

Downlink is similar to this, and details are not provided again.

A CC combination is used as an example. As shown in FIG. 16A, a simultaneously configurable CC combination reported by the terminal device is CC1, CC2, CC3, and CC4, and a simultaneously activatable CC combination reported by the terminal is CC1, CC2, CC3, and CC4. That is, a quantity of simultaneously activatable CCs is 4. A switchable CC combination of the terminal is CC1, CC2, CC3, and CC4. A simultaneously transmittable CC combination reported by the terminal is CC3 and CC4. That is, a maximum quantity of simultaneously transmittable CCs is 2. For example, a CC used by the terminal device for transmission is switched from CC2 to CC3 and CC4, that is, a channel used by CC2 is switched to CC3 and CC4. For example, CC2 uses two channels: a channel 1 and a channel 2. The channel 1 may be switched to CC3, and the channel 2 may be switched to CC4. The base station may indicate, via DCI signaling, the user to switch a channel used by CC2 to CC3 and CC4. A latency required for switch a channel used by CC2 to CC3 and CC4 is approximately one to four symbols.

In another example, as shown in FIG. 16B, a simultaneously configurable CC combination reported by the terminal device is CC1, CC2, CC3, and CC4. A simultaneously activatable CC combination 1 reported by the terminal is CC1 and CC2, and a simultaneously activatable CC combination 2 reported by the terminal is CC3 and CC4. CC1 and CC2 may be simultaneously activated, and CC3 and CC4 may be simultaneously activated. In other words, a quantity of simultaneously activatable CCs is 2. A simultaneously transmittable CC combination reported by the terminal is CC3 and CC4. CC3 and CC4 may be simultaneously transmitted, that is, a maximum quantity of simultaneously transmittable CCs is 2. For example, when CC1 and CC2 in the simultaneously activatable CC combination 1 are in an active state, the terminal device may switch a channel used by CC to CC2. For example, the terminal device deactivates CC1 and CC2 in the simultaneously activatable CC combination 1, and the terminal device activates CC3 and CC4 in the simultaneously activatable CC combination 2. For example, when CC3 and CC4 in the simultaneously activatable CC combination 2 are in an active state, because CC3 and CC4 are also a simultaneously transmittable CC combination, the terminal device may perform transmission simultaneously on CC3 and CC4.

A CC combination as an example in the foregoing two examples. A band combination, a serving cell combination, or a CC/band bandwidth combination is similar to this, and details are not described again. A CC combination in examples in FIG. 16A and FIG. 16B may be an uplink CC combination or may be a downlink CC combination. This is not limited in this application.

In some other embodiments of this application, the terminal device switches a serving cell state based on a time pattern. The time pattern may be indicated by the network device to the terminal device, or may be protocol predefined. The network device may send time pattern configuration signaling or time pattern activation signaling to the terminal device, to switch the serving cell state. For the time pattern, refer to the related descriptions of the time pattern in the description about the carrier state. Details are not described herein again. For example, the time pattern configuration signaling or the time pattern activation signaling may be DCI, RRC signaling, MAC CE signaling, or the like. This is not limited.

Alternatively, in some embodiments, the network device may implicitly indicate, based on uplink data scheduling, to switch a serving cell state. For example, in a same time unit, the network device schedules the terminal device to send a PUSCH on an uplink carrier of a serving cell 1 through one port (port), and to send a PUSCH on an uplink carrier of a serving cell 2 through one port. In this case, serving cell states of the serving cell 1 and the serving cell 2 are both active states, and a serving cell state of another active serving cell of the terminal device is the first state.

In addition, the terminal device implements uplink communication on an uplink carrier through a port/channel/transmit antenna. However, a port/channel/transmit antenna used by or configured for an uplink carrier is indicated by the network device to the terminal device. However, when the network device configures a plurality of uplink carriers for the terminal device, the network device usually configures one or more ports/channels/transmit antennas for each uplink carrier, and ports/channels/transmit antennas configured for different uplink carriers are different. Even if uplink communication is not performed on an uplink carrier, a port/channel configured for the uplink carrier cannot be used by another uplink carrier. This easily wastes resources and affects communication efficiency. In view of this, embodiments of this application provide a communication method. An example in which a terminal device implements uplink communication on an uplink carrier through a port is used. As shown in FIG. 5, the communication method may be applied to a CA, DC, or SUL scenario or a scenario in which CA and SUL are combined, and specifically, includes the following steps. A manner in which the terminal device implements uplink communication on an uplink carrier through a channel/transmit antenna is similar to this. This can be referred to.

501. A terminal device performs uplink communication on a first carrier through N ports, where N is a positive integer.

502. A network device sends a second instruction to the terminal device, where the second instruction indicates to perform uplink communication on a second carrier through Q ports, the Q ports include K ports in the N ports used on the first carrier in step 501, Q is a positive integer, $0 < K \leq N$, and N−K+Q does not exceed a maximum quantity of ports supported by uplink communication of the terminal device.

503. The terminal device performs uplink communication on the second carrier through the Q ports based on the second instruction.

In embodiments of this application, because the network device may configure ports configured for the first carrier for the second carrier to use, thereby improving utilization of ports, and helping improve communication efficiency of the terminal device.

The first carrier and the second carrier may be two uplink carriers in a same serving cell of the terminal device, or may be two uplink carriers in different serving cells of the terminal device. This is not limited. The first carrier and the second carrier do not limit a case in which only two carriers are included in embodiments of this application, and the terminal device may allocate and switch a quantity of ports on at least two carriers. In addition, in embodiments of this application, the first carrier and the second carrier may belong to a same band, or may belong to different bands.

In an implementation, when performing uplink communication on the first carrier through N ports, the terminal device may also perform uplink communication on the second carrier through M ports, where M+N does not exceed a maximum quantity of ports supported by uplink communication of the terminal device. In addition, the N ports used on the first carrier are different from the M ports used on the second carrier. In other words, the terminal device may perform uplink communication on the first carrier and the second carrier through different ports in a same time unit. In this case, if the terminal device receives the second instruction, Q ports used on the second carrier may include the previously used M ports and K ports in the N ports used on the first carrier.

In another implementation, when performing uplink communication on the first carrier through the N ports, the terminal device does not perform uplink communication on the second carrier. In this case, if the terminal device receives a second instruction, Q ports used on the second carrier include at least K ports in the N ports used on the first carrier.

It may be understood that when a value of K is equal to N, if the terminal device receives a second instruction, the terminal device subsequently does not perform uplink communication on the first carrier. When a value of K is less than N, after receiving a second instruction, the terminal device may continue performing uplink communication on the first carrier through N−K ports. Optionally, a same port may also correspond to different uplink carriers. In other words, the terminal device may perform uplink transmission on the at least two uplink carriers through a same port. For example, two consecutive uplink carriers on a band may correspond to a same port.

For example, the network device may include the second instruction in DCI and send the DCI to the terminal device, or may include the second instruction in RRC signaling or MAC CE signaling and send the RRC signaling or MAC CE signaling to the terminal device, or may include the second instruction in other information and send the other information to the terminal device. This is not limited.

In some embodiments, the network device may dynamically or semi-persistently send, to the terminal device, an updated quantity of ports used on the uplink carrier. For example, the network device may send the second instruction to the terminal device as triggered by an event. For example, when detecting that an amount of data that needs to be transmitted on the first carrier is less than, greater than, or equal to a threshold, the network device sends the second instruction to some terminal devices, to indicate the terminal devices to perform transmission on other uplink carriers, thereby achieving network load balancing. The second instruction may further indicate the terminal device not to perform uplink communication on the first carrier. That is, a quantity of ports used on the first carrier is 0. In another example, when detecting that an amount of data that needs to be transmitted on the second carrier is greater than an amount of data that needs to be transmitted on the first carrier, the network device sends the second instruction to the terminal device. In some other embodiments, the network device may further periodically update a quantity of ports used on the uplink carrier, so that the terminal device can periodically switch to the uplink carrier to perform uplink communication. For example, the terminal device periodically switches to an uplink carrier to send an SRS.

Figure 6A:
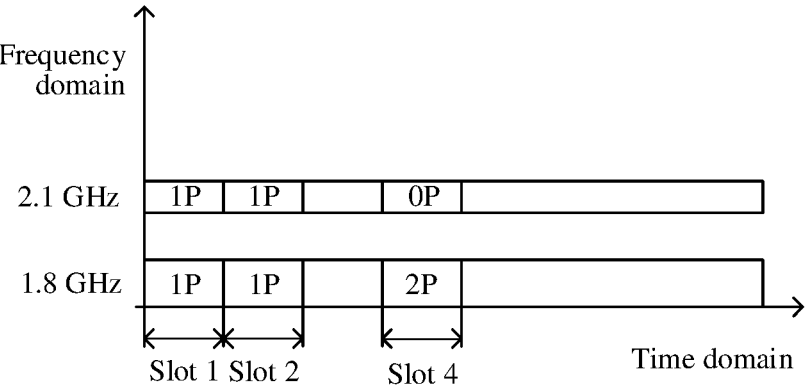
FIG. 6A is a schematic diagram of a case of using ports by different carriers according to an embodiment of this application.

For example, using an example in which a maximum quantity of ports supported by uplink communication of the terminal device is 2, as shown in FIG. 6A, the terminal device performs uplink communication through one port (port is abbreviated as P for short) on an uplink carrier whose center frequency is 2.1 GHz in a slot 1 and a slot 2, performs uplink communication through another port on an uplink carrier whose center frequency is 1.8 GHz in the slot 1 and the slot 2, and does not perform uplink communication on an uplink carrier whose center frequency is 2.1 GHz in a slot 4. If the terminal device needs to perform uplink communication on an uplink carrier whose center frequency is 1.8 GHz in the slot 4, uplink communication may be performed on the uplink carrier whose center frequency is 1.8 GHz through two ports in the slot 4, thereby helping improve communication efficiency.

Figure 6B:
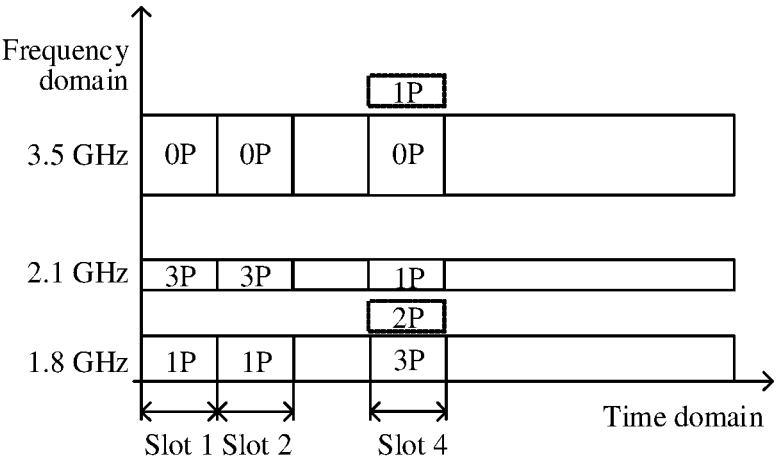
FIG. 6B is a schematic diagram of a case of using ports by different carriers according to another embodiment of this application.

For example, a maximum quantity of ports supported by uplink communication of the terminal device is 4. As shown in FIG. 6B, the terminal device performs uplink communication through three ports on an uplink carrier whose center frequency is 2.1 GHz in a slot 1 and a slot 2, performs uplink communication through another port on an uplink carrier whose center frequency is 1.8 GHz in the slot 1 and the slot 2, and performs uplink communication through one port on an uplink carrier whose center frequency is 2.1 GHz in a slot 4. If the terminal device needs to perform uplink communication through one port on the uplink carrier whose center frequency is 2.1 GHz in the slot 4, uplink communication may be performed on the uplink carrier whose center frequency is 1.8 GHz through two or three ports in the slot 4, thereby helping improve communication efficiency. Specifically, in the slot 4, a quantity of ports that can be used for uplink communication on the uplink carrier whose center frequency is 1.8 GHz may be indicated by the network device, or may be set by the terminal device based on a data transmission requirement of the terminal device. For example, in the slot 4, if a quantity of ports on the uplink carrier whose center frequency is 2.1 GHz is 1, in addition to performing uplink communication on the uplink carrier whose center frequency is 1.8 GHz, in the slot 4, the terminal device further needs to perform uplink communication on the uplink carrier whose center frequency is 3.5 GHz. In this case, in the slot 4, the terminal device may perform uplink communication on the uplink carrier whose center frequency is 1.8 GHz through two ports, and perform uplink communication on the uplink carrier whose center frequency is 3.5 GHz through one port.

Figure 6C:
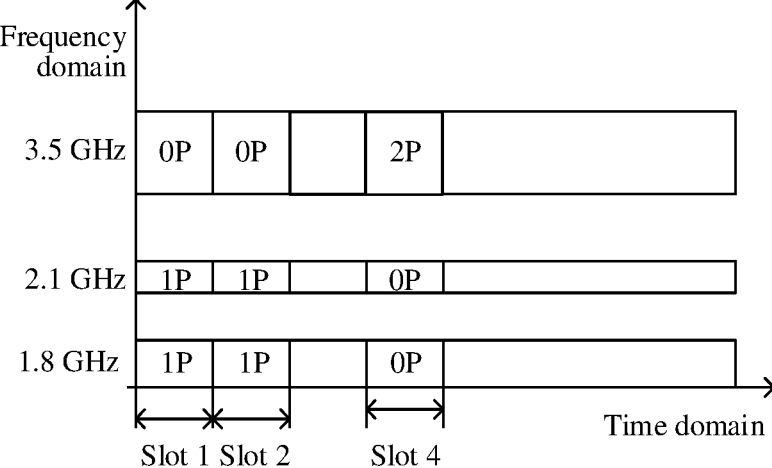
FIG. 6C is a schematic diagram of a case of using ports by different carriers according to another embodiment of this application.

In another example, using an example in which a maximum quantity of ports supported by uplink communication of the terminal device is 2. As shown in FIG. 6C, the terminal device performs uplink communication through one port on an uplink carrier whose center frequency is 2.1 GHz in a slot 1 and a slot 2, performs uplink communication through another port on an uplink carrier whose center frequency is 1.8 GHz in the slot 1 and the slot 2, and does not perform uplink communication on uplink carriers whose center frequencies are 2.1 GHz and 1.8 GHz in a slot 4. If the terminal device needs to perform uplink communication on an uplink carrier whose center frequency is 3.5 GHz in the slot 4, uplink communication may be performed on the uplink carrier whose center frequency is 3.5 GHz through two ports in the slot 4. In this case, in the slot 4, quantities of ports used by the uplink carriers whose center frequencies are 2.1 GHz and 1.8 GHz are 0, thereby helping improve communication efficiency.

Figure 6D:
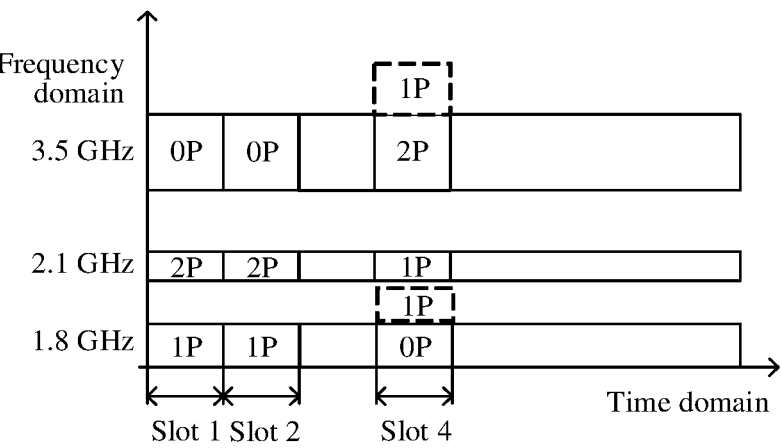
FIG. 6D is a schematic diagram of a case of using ports by different carriers according to another embodiment of this application.

For example, a maximum quantity of ports supported by uplink communication of the terminal device is 3. As shown in FIG. 6D, the terminal device performs uplink communication through two ports on an uplink carrier whose center frequency is 2.1 GHz in a slot 1 and a slot 2, performs uplink communication through another port on an uplink carrier whose center frequency is 1.8 GHz in the slot 1 and the slot 2, and performs uplink communication through one port on the uplink carrier whose center frequency is 2.1 GHz in a slot 4. If the terminal device does not need to perform uplink communication on the uplink carrier whose center frequency is 1.8 GHz in the slot 4 and needs to perform uplink communication through one port on the uplink carrier whose center frequency is 3.5 GHz in the slot 4, uplink communication may be performed on the uplink carrier whose center frequency is 3.5 GHz through the two ports in the slot 4, thereby helping improve communication efficiency. Alternatively, if the terminal device performs uplink communication through one port on the uplink carrier whose center frequency is 2.1 GHz in the slot 4, and performs uplink communication through one port on the uplink carrier whose center frequency is 1.8 GHz in the slot 4, when the uplink carrier whose center frequency is 3.5 GHz needs to perform uplink communication in the slot 4, uplink communication may be performed on the uplink carrier whose center frequency is 3.5 GHz through one port in the slot 4.

In some other embodiments, after first duration since the terminal device receives the second instruction, the terminal device performs uplink communication on the second carrier through the K ports in the N ports. The first duration is a switching latency required when a quantity of ports on the second carrier is switched. This helps improve reliability of uplink communication. For example, a start moment of the first duration may be indicated by the network device to the terminal device, or may be determined by the terminal device based on a policy, or a start moment of the first duration is protocol defined. For example, the start moment of the first duration is a moment at which the terminal device receives the second instruction or a moment at which the terminal device receives and parses content of the second instruction. The first duration may be protocol predefined, or may be indicated by the network device to the terminal device, or may be reported by the terminal device. For example, the first duration may be defined by using time units, or may be an absolute time. This is not limited. For example, the first duration is a quantity of fixed symbols in a reference parameter set. The reference numerology may be predefined or configured, or may be the same as a numerology of an active BWP on an uplink carrier (for example, an uplink carrier of a primary cell, a first carrier, or a second carrier). For different numerologies, quantities of symbols corresponding to the first duration may be different. Optionally, the first duration is related to at least one of a source band combination, a target band combination, a band of a source uplink carrier, a band of a target uplink carrier, a quantity of source ports, a quantity of target ports, a quantity of source transmit antennas, a quantity of target transmit antennas, a quantity of source transmit channels, a quantity of target transmit channels, a quantity of source carriers, and a quantity of target carriers. A band combination and a carrier band are, in the first duration, related to a band combination/band corresponding to a carrier on which switching occurs. The quantity of source ports is a quantity of ports of the terminal device on the second carrier in a case before a quantity of ports on the second carrier is switched to Q. The quantity of source transmit antennas is a quantity of transmit antennas of the terminal device on the second carrier in a case before a quantity of ports on the second carrier is switched to Q. The quantity of source transmit channels is a quantity of channels of the terminal device on the second carrier in a case before a quantity of ports on the second carrier is switched to Q. The quantity of target ports is a quantity of ports of the terminal device on the second carrier in a case after the quantity of ports on the second carrier is switched to Q. The quantity of target transmit antennas is a quantity of transmit antennas of the terminal device on the second carrier in a case after a quantity of ports on the second carrier is switched to Q. The quantity of target channels is a quantity of channels of the terminal device on the second carrier in a case after a quantity of ports on the second carrier is switched to Q. The quantity of source carriers is a quantity of uplink carriers on which the terminal device performs simultaneous sending before a quantity of ports on the second carrier is switched. The quantity of target carriers is a quantity of uplink carriers on which the terminal device performs simultaneous sending after a quantity of ports on the second carrier is switched.

For example, in embodiments of this application, port/transmit channel switching latencies between carriers belonging to a same band, port/transmit channel switching latencies between carriers belonging to different bands, and/or port/transmit channel switching latencies of different quantities of ports may be unified, thereby helping simplify implementation. Alternatively, different port/transmit channel switching latencies are configured for the foregoing different cases. In this case, a port switching latency may be determined based on a switching status of a carrier and/or a band to which the carrier belongs, or a quantity of ports. Further, in some embodiments, for port/transmit channel switching in the foregoing different cases, the terminal device obtains capability information of a terminal switching latency, and the terminal device may separately report the switching latency capability. Specifically, for port/transmit channel switching statuses on different carriers/carrier bands or different quantities of ports/transmit channels, the terminal device may separately report switching latencies. For example, a port switching latency of switching from 0 ports to 1 port, and switching from a carrier 1 to a carrier 2, is a latency 1, where the carrier 1 and the carrier 2 belong to different bands. In another example, a port switching latency of switching from 1 port to 2 ports, and switching from a carrier 2 to a carrier 3 is a latency 2, where the carrier 2 and the carrier 3 belong to a same band. The terminal device separately reports the latency 1 and the latency 2.

For example, for a same carrier, switching from one port to two ports and switching from zero port to two ports require different switching latencies. In another example, port switching latencies between different carriers may also be different. For example, switching durations required for switching from a carrier 1 to a carrier 2 is different from a switching duration required for switching from the carrier 2 to a carrier 3. In another example, port switching latencies on different carriers may also be different. For example, a latency of switching the terminal device from 0 ports to 2 ports on a carrier 4 is t1, and a latency of switching the terminal device from 0 ports to 2 ports on a carrier 5 is t2. The terminal device separately reports the latency t1 and the latency t2.

For example, at least two of "a latency t1 for switching two channels of a band/carrier 1 to one channel of the band/carrier 1 and one channel of a band/carrier 2", "a latency t2 for switching two channels of the band/carrier 1 to zero channels of the band/carrier 1 and two channels of the band/carrier 2", and "a latency t3 for switching two channels of the band/carrier 1 to zero channels of the band/carrier 1, one channel of the band/carrier 2, and one channel of a band/carrier 3" are different.

In some other embodiments, the terminal device reports capability information to the network device. The capability information includes a band supported by the terminal device and a maximum quantity of ports supported by the band supported by the terminal device. This helps the network device configure a corresponding quantity of ports for an uplink carrier of a serving cell configured for the terminal device. Further, the capability information reported by the terminal device to the network device may further include a maximum quantity of ports supported by uplink communication of the terminal device.

A first carrier is used as an example. Notably, in embodiments of this application, a quantity of ports used by the terminal device on the first carrier is related to a quantity of channels configured for the terminal device on the first carrier. Notably, the quantity of ports used by the terminal device on the first carrier is configured by the network device. A quantity of ports configured on the first carrier is less than or equal to a quantity of channels configured on the first carrier or reported by the terminal device. For example, if the quantity of channels configured on the first carrier is 1, the quantity of ports configured on the first carrier may be 1 or 0. In another example, if the quantity of channels configured on the first carrier is 2, the quantity of ports configured on the first carrier may be 2, 1, or 0. In another example, if the quantity of channels configured on the first carrier is 0, the quantity of ports configured on the first carrier may be 0.

In embodiments of this application, an uplink transmit channel of the terminal device on an uplink carrier is a radio frequency channel used by the terminal device for sending on the uplink carrier, and corresponds to a power amplifier. An uplink transmit antenna of the terminal device on a carrier is a physical antenna used by the terminal device for sending on the carrier. An uplink transmit port of the terminal device on a carrier is a logical port number corresponding to a signal sent by the terminal device on the carrier. There is an independent DMRS signal on each port number for the network device to demodulate a signal on each port number. A downlink receive channel of the terminal device on one downlink carrier is a radio frequency channel used by the terminal device to perform receiving on the downlink carrier. A downlink receive antenna of the terminal device on one carrier is a physical antenna used by the terminal device to perform for receiving on the carrier. A downlink receive port of the terminal device on a carrier is a logical port number corresponding to a signal received by the terminal device on the carrier.

An uplink receive channel of the network device on an uplink carrier is a radio frequency channel used by the network device to perform receiving on the uplink carrier. An uplink receive antenna of the terminal device on an uplink carrier is a physical antenna used by the terminal device to perform receiving on the carrier. An uplink receive port of the terminal device on an uplink carrier is a logical port number corresponding to a signal received by the terminal device on the carrier. A downlink transmit channel of the network device on a downlink carrier is a radio frequency channel used by the network device to perform sending on the carrier. A downlink transmit antenna of the network device on a downlink carrier is a physical antenna used by the network device to perform sending on the carrier. A downlink transmit port of the terminal device on a downlink carrier is a logical port number corresponding to a signal sent by the terminal device on the carrier.

Relationships between a channel, a port, and an antenna are as follows: A maximum quantity of uplink transmit antennas of the terminal device on an uplink carrier is greater than or equal to a maximum quantity of uplink transmit channels and is greater than or equal to a maximum quantity of transmit ports. A maximum quantity of receive antennas of the terminal device on a downlink carrier is greater than or equal to a maximum quantity of downlink receive channels and is greater than or equal to a maximum quantity of receive ports. A maximum quantity of uplink receive antennas of the network device on one uplink carrier is greater than or equal to a maximum quantity of uplink receive channels, and is greater than or equal to a maximum quantity of receive ports. A maximum quantity of transmit antennas of the network device on one downlink carrier is greater than or equal to a maximum quantity of downlink transmit channels, and is greater than or equal to a maximum quantity of transmit ports. The network device may configure at least one of a quantity of channels, a quantity of ports, and a quantity of antennas for the terminal device, to implement communication between the network device and the terminal device.

Using an example in which a first carrier and a second carrier are configured for the terminal device, and a maximum quantity of uplink channels supported by uplink communication of the terminal device is 2, a relationship between a quantity of channels and a quantity of ports on a carrier may be shown in Table 1.

TABLE 1

| Status | Quantity of channels (number of Tx chains) First carrier + second carrier | Quantity of ports (number of antenna ports) First carrier + second carrier |
|---|---|---|
| 1 | 1T + 1T | 1P + 0P, 1P + 1P, 0P + 1P |
| 2 | 1T + 0T | 1P + 0P |

TABLE 1-continued

| Status | Quantity of channels (number of Tx chains) First carrier + second carrier | Quantity of ports (number of antenna ports) First carrier + second carrier |
|---|---|---|
| 3 | 0T + 1T | 0P + 1P |
| 4 | 0T + 2T | 0P + 2P, 0P + 1P |
| 5 | 2T + 0T | 2P + 0P, 1P + 0P |

Therefore, based on Table 1, the ports in step 501 to step 503 may alternatively be channels or transmit antennas. For specific implementation, refer to related descriptions of the ports. Details are not described herein again. For example, for a channel switching latency, for example, a switching latency of switching a carrier from one channel to two channels may be one symbol of 30 kHz, and a switching latency of switching a carrier from zero channel to two channels may be two symbols of 30 kHz, or may be an absolute time, for example, 70 μs.

In addition, in some other embodiments of this application, the network device may further configure one or more time patterns for an uplink carrier configured for the terminal device. A time pattern specifies which ports/channels/transmit antennas are used by an uplink carrier in which time units. In this case, the network device switches a port/channel/transmit antenna used by the uplink carrier without sending a second instruction.

For example, each uplink carrier may correspond to one time pattern, or all uplink carriers configured for the terminal device correspond to one time pattern. For example, one uplink carrier corresponds to one time pattern, and a maximum quantity of ports supported by uplink communication of the terminal device is 2. For example, the uplink carrier configured by the network device for the terminal device includes a first carrier and a second carrier, and a time pattern of the first carrier is a time pattern 1, and includes 10 time units. For the first carrier, the terminal device may perform uplink communication through two ports (for example, a port 1 and a port 2) in the first three time units, perform uplink communication through one port (for example, the port 1) in the fourth to seventh time units, and perform uplink communication without using a port in the last three time units. A time pattern of the second carrier is a time pattern 2, and also includes 10 time units. For the second carrier, the terminal device may perform uplink communication without using a port in the first three time units, perform uplink communication through one port (for example, the port 2) in the fourth to seventh time units, and may perform uplink communication through two ports (for example, the port 1 and the port 2) in the last three time units.

For example, before receiving a new time pattern configured by the network device for the uplink carrier, the terminal device may perform uplink communication by periodically using the previously configured time pattern. Alternatively, the network device may periodically configure a time pattern for the uplink carrier for the terminal device.

Notably, in embodiments of this application, if a single carrier is considered, using the first carrier as an example, the terminal device performs uplink communication on the first carrier through N ports in a first time unit, and the terminal device performs uplink communication on the first carrier through M ports in a second time unit, where N and M are positive integers greater than or equal to 0, and N and M are not equal. For example, for the first carrier, the terminal device may switch from the N ports to the M ports in the second time unit based on a switching instruction from the network device. Alternatively, the terminal device switches from the N ports to the M ports in the second time unit based on the time pattern of the first carrier.

Figure 7:
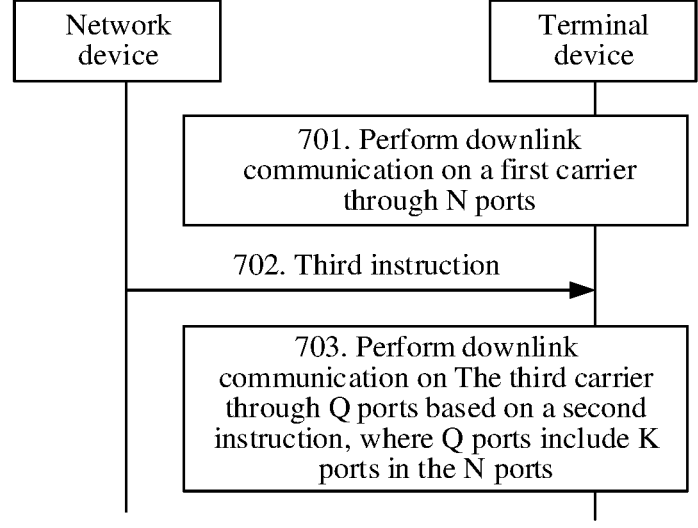
FIG. 7 is a schematic flowchart of another communication method according to an embodiment of this application.

The terminal device implements downlink communication on a downlink carrier through a port/channel/receive antenna. However, a port/channel/receive antenna used by or configured for a downlink carrier is indicated by the network device to the terminal device. However, when the network device configures a plurality of downlink carriers for the terminal device, the network device usually configures one or more ports/channels/receive antennas for each downlink carrier, and ports/channels/receive antennas configured for different downlink carriers are different. Even if a downlink carrier is not used for performing downlink communication, a port/channel/receive antenna configured for the downlink carrier cannot be used by another downlink carrier. This easily wastes resources and affects communication efficiency. In view of this, embodiments of this application provide another communication method, which may be applied to a CA or DC scenario. A port is used as an example. As shown in FIG. 7, the method specifically includes the following steps.

701. A terminal device performs downlink communication on a first carrier through N ports, where N is a positive integer.

702. A network device sends a third instruction to the terminal device, where the third instruction indicates to perform downlink communication on a second carrier through Q ports, the Q ports used on the second carrier include K ports in the N ports used on the first carrier, K and Q are positive integers, $0 < K \leq N$, and N−K+Q does not exceed a maximum quantity of ports supported by downlink communication of the terminal device.

703. After receiving the third instruction, the terminal device performs downlink communication on the second carrier through the Q ports based on the third instruction.

For the first carrier and the second carrier, refer to related descriptions in the communication method shown in FIG. 5. Details are not described herein again.

Alternatively, a port in FIG. 7 may be a receive antenna or a channel. In other words, a downlink receiving capability of another carrier can be borrowed as a downlink receiving capability of the terminal device on a downlink carrier. For example, the network device may dynamically schedule the terminal device for port switching on different carriers. For example, the third instruction may be carried in DCI and sent to the terminal device. Alternatively, the third instruction may be a CSI-RS, and a CSI-RS is configured and sent by using different port configurations, to implicitly indicate receiving capability switching of the terminal device. Different quantities of ports correspond to different CSI-RSs. CSI-RSs corresponding to different quantities of ports may be indicated by the network device to the terminal device, or may be protocol predefined. This is not limited. Alternatively, the third instruction may be different scheduling parameters, for example, an MCS, an RI, or a PMI. Different quantities of ports correspond to different scheduling parameters.

Further, in some embodiments, after second duration since the terminal device receives a third instruction, the terminal device performs downlink communication on the second carrier through the K ports. The second duration is a port switching latency between the second carrier and the first carrier. For the second duration and the start moment of the second duration, refer to related descriptions in the communication method shown in FIG. 5. Details are not described herein again.

Optionally, the second duration is related to at least one of a source band combination, a target band combination, a band of a source downlink carrier, a band of a target downlink carrier, a quantity of source ports, a quantity of target ports, a quantity of source receive antennas, a quantity of target receive antennas, a quantity of source receive channels, a quantity of target receive channels, a quantity of source carriers, and a quantity of target carriers. A band combination and a carrier band are, in the second duration, related to a band combination/band corresponding to a carrier on which switching occurs. The quantity of source ports is a quantity of ports of the terminal device on the second carrier in a case before a quantity of ports on the second carrier is switched to Q. The quantity of source receive antennas is a quantity of receive antennas of the terminal device on the second carrier in a case before a quantity of ports on the second carrier is switched to Q. The quantity of source receive channels is a quantity of channels of the terminal device on the second carrier in a case before a quantity of ports on the second carrier is switched to Q. The quantity of target ports is a quantity of ports of the terminal device on the second carrier in a case after the quantity of ports on the second carrier is switched to Q. The quantity of target receive antennas is a quantity of receive antennas of the terminal device on the second carrier in a case after a quantity of ports on the second carrier is switched to Q. The quantity of target channels is a quantity of channels of the terminal device on the second carrier in a case after a quantity of ports on the second carrier is switched to Q. The quantity of source carriers is a quantity of uplink carriers on which the terminal device performs simultaneous receiving before a quantity of ports on the second carrier is switched. The quantity of target carriers is a quantity of uplink carriers on which the terminal device performs simultaneous receiving after a quantity of ports on the second carrier is switched.

For example, in embodiments of this application, port/receive channel switching latencies between carriers belonging to a same band, port/receive channel switching latencies between carriers belonging to different bands, and/or port/receive channel switching latencies of different quantities of ports may be the same, thereby helping simplify implementation. Alternatively, different port/receive channel switching latencies are configured for the foregoing different cases. In this case, a port switching latency may be determined based on a switching status of a carrier and/or a band to which the carrier belongs, or a quantity of ports. Further, in some embodiments, for port/receive channel switching in the foregoing different cases, the terminal device obtains separately capability information of a corresponding terminal switching latency, and the terminal device may separately report the switching latency capability. Specifically, for port/receive channel switching statuses on different carriers/carrier bands or different quantities of ports/receive channels, the terminal device may separately report switching latencies. For example, a port switching latency of switching from 0 ports to 1 port, and switching from a carrier 1 to a carrier 2, where the carrier 1 and the carrier 2 belong to different bands, is a latency 1. In another example, a port switching latency of switching from 1 port to 2 ports, and switching from a carrier 2 to a carrier 3, where the carrier 2 and the carrier 3 belong to a same band, is a latency 2. The terminal device separately reports the latency 1 and the latency 2.

For example, for a same carrier, switching from one port to two ports and switching from zero port to two ports require different switching latencies. In another example, port switching latencies between different carriers may also be different. For example, switching duration required for switching from a carrier 1 to a carrier 2 is different from switching duration required for switching from the carrier 2 to a carrier 3. In another example, port switching latencies on different carriers may also be different. For example, a latency of switching the terminal device from 0 ports to 2 ports on a carrier 4 is t1, and a latency of switching the terminal device from 0 ports to 2 ports on a carrier 5 is t2. The terminal device separately reports the latency t1 and the latency t2.

For example, at least two of "a latency t1 for switching two channels of a band/carrier 1 to one channel of the band/carrier 1 and one channel of a band/carrier 2", "a latency t2 for switching two channels of the band/carrier 1 to zero channels of the band/carrier 1 and two channels of the band/carrier 2", and "a latency t3 for switching two channels of the band/carrier 1 to zero channels of the band/carrier 1, one channel of the band/carrier 2, and one channel of a band/carrier 3" are different.

In some other embodiments of this application, the terminal device may further report first indication information to the network device. The first indication information indicates whether the terminal device supports an inter-carrier port switching capability or whether the terminal device supports switching of a quantity of ports on one carrier, including uplink sending and downlink receiving performed by the terminal device, that is, whether the terminal device supports switching of ports configured on different carriers. This helps the network device send a port switching instruction (for example, a third instruction) to the terminal device.

In embodiments of this application, because the terminal device can implement port switching between different carriers when the terminal device supports the inter-carrier port switching capability, thereby helping enhance downlink experience of the terminal device. For example, a maximum quantity of ports supported by the terminal device on the first carrier is 4, and a maximum quantity of ports supported by the terminal device on the second carrier is 2. When a maximum quantity of ports supported by downlink communication of the terminal device is 4, two ports are configured on the first carrier, and two ports are configured on the second carrier, if there is no downlink communication demand on the second carrier, the first carrier may borrow the two ports configured on the second carrier, so that the first carrier can perform communication through the four ports, thereby improving communication efficiency.

Figure 8:
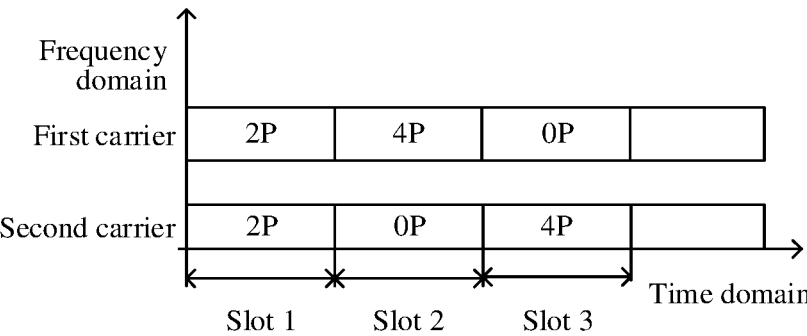
FIG. 8 is a schematic diagram of a case of using ports by different carriers according to another embodiment of this application.

For example, a maximum quantity of ports supported by the terminal device on the first carrier is 4, when both the maximum quantity of ports supported by the terminal device on the first carrier and a maximum quantity of ports supported by the terminal device on the second carrier are 4, as shown in FIG. 8, in a slot 1, two ports are configured on the first carrier, and two ports are configured on the second carrier. In other words, the terminal device performs downlink communication in the slot 1 through the two ports on the first carrier and the two ports on the second carrier respectively. In a slot 2, four ports are configured on the first carrier, and no port is configured on the second carrier. To be specific, in the slot 2, the terminal device performs downlink communication on the first carrier through the four ports, and does not perform downlink communication on the second carrier. In a slot 3, no port is configured on the first carrier, and four ports are configured on the second carrier. To be specific, in the slot 3, the terminal device performs downlink communication on the second carrier through the four ports, and does not perform downlink communication on the first carrier.

Notably, for the terminal device, the downlink receiving capability of the terminal device may be further measured by using a quantity of receive antennas and a quantity of channels. Therefore, the port in step 701 to step 703 may alternatively be a receive antenna or a channel.

Notably, in some other embodiments of this application, the network device may further configure one or more time patterns for a downlink carrier configured for the terminal device. A time pattern specifies which ports/channels/receive antennas are used by a downlink carrier in which time units. In this case, the network device switches a port/channel/receive antenna used by the downlink carrier without sending a third instruction. For example, each downlink carrier may correspond to one time pattern, or all downlink carriers configured for the terminal device correspond to one time pattern. For example, one downlink carrier corresponds to one time pattern, and a maximum quantity of ports supported by downlink communication of the terminal device is 3. For example, the downlink carrier configured by the network device for the terminal device includes a first carrier and a second carrier, and a time pattern of the first carrier is a time pattern 1, and includes 10 time units. For the first carrier, the terminal device may perform uplink communication through three ports (for example, a port 1, a port 2 and a port 3) in the first three time units, perform uplink communication through one port (for example, the port 1) in the fourth to seventh time units, and perform uplink communication without using a port in the last three time units. A time pattern of the second carrier is a time pattern 2, and also includes 10 time units. For the second carrier, the terminal device may perform downlink communication without using a port in the first three time units, perform downlink communication through one port (for example, the port 2 and the port 3) in the fourth to seventh time units, and may perform downlink communication through three ports (for example, the port 1, the port 2, and the port 3) in the last three time units.

For example, before receiving a new time pattern configured by the network device for the downlink carrier, the terminal device may perform downlink communication by periodically using the previously configured time pattern. Alternatively, the network device may periodically configure a time pattern for the downlink carrier for the terminal device.

Notably, in embodiments of this application, if a single carrier is considered, using the first carrier as an example, the terminal device performs downlink communication on the first carrier through N ports in a first time unit, and the terminal device performs downlink communication on the first carrier through M ports in a second time unit, where N and M are positive integers greater than or equal to 0, and N and M are not equal. For example, for the first carrier, the terminal device may switch from the N ports to the M ports in the second time unit based on a switching instruction from the network device. Alternatively, the terminal device switches from the N ports to the M ports in the second time unit based on the time pattern of the first carrier.

In addition, the network device in embodiments of this application may have a fixed downlink sending capability for a downlink carrier. Specifically, the downlink sending capability of the network device for the downlink carrier may be measured by using a quantity of transmit antennas or a quantity of ports (which may also be referred to as a quantity of transmit antenna ports) used for downlink communication. For example, a first carrier and a second carrier are used as an example. A quantity of transmit antennas used by the network device for the first carrier is 64, and a quantity of transmit antennas used by the network device for the second carrier is also 64. In this case, the network device usually performs downlink communication on the first carrier through 64 transmit antennas, and performs downlink communication on the second carrier through 64 transmit antennas. In the conventional technology, when the network device does not perform downlink communication on the second carrier, usually, a quantity of antennas for performing downlink communication on the second carrier does not exceed 64. As a result, resources are easily wasted.

In view of this, embodiments of this application further provide a communication method. As shown in FIG. 9, the communication method may be applied to a CA or DC scenario, and specifically includes the following steps.

901. A network device performs downlink communication on a first carrier in a first time unit through N transmit antennas, and performs downlink communication on a second carrier in the first time unit through M transmit antennas, where M and N are positive integers.

902. The network device performs downlink communication on the second carrier in a second time unit through P transmit antennas, where P is a positive integer, M<P≤M+N, the P transmit antennas include at least one transmit antenna in the M transmit antennas used by the second carrier and the N transmit antennas used by the first carrier, and the network device does not perform downlink communication on the first carrier in the second time unit.

Notably, in the communication method shown in FIG. 9, the first carrier and the second carrier may be downlink carriers of different terminal devices, or may be downlink carriers of different serving cells of a same terminal device. The first carrier and the second carrier may be downlink carriers in one serving cell of a same terminal device, or may be downlink carriers in different serving cells of a same terminal device. This is not limited.

For example, a downlink carrier 1 and a downlink carrier 2 are used as an example. A quantity of transmit antennas (transmit antenna, T for short) of the network device for the downlink carrier 1 is 64, and a quantity of transmit antennas of the network device for the downlink carrier 2 is also 64. As shown in FIG. 10, the network device performs downlink communication on the downlink carrier 1 through 64 transmit antennas in a time unit 1, and performs downlink communication on the downlink carrier 2 through 64 transmit antennas in the time unit 1. The network device performs downlink communication on the downlink carrier 2 through 128 transmit antennas in a time unit 2, and does not perform communication on the downlink carrier 1 in the time unit 2. The network device performs downlink communication on the downlink carrier 1 through 128 transmit antennas in a time unit 3, and does not perform downlink communication on the downlink carrier 2 in the time unit 3. This helps improve downlink communication efficiency.

It may be understood that the transmit antenna in step 901 to step 902 may alternatively be a transmit antenna port or a channel.

Similar to the downlink carrier, in embodiments of this application, the network device has a fixed uplink receiving capability for the uplink carrier. Specifically, the uplink receiving capability of the network device for the uplink carrier may be measured by using a quantity of receive antennas or a quantity of ports (which may also be referred to as a quantity of receive antenna ports) used for uplink communication. For example, the first carrier and the second carrier are used as an example. A quantity of receive antennas used by the network device for the first carrier is 64, and a quantity of receive antennas used by the network device for the second carrier is also 64. In this case, the network device usually performs uplink communication on the first carrier through 64 receive antennas, and performs uplink communication on the second carrier through 64 receive antennas. In the conventional technology, when the network device does not perform uplink communication on the second carrier, usually, a quantity of antennas for performing uplink communication on the second carrier does not exceed 64. As a result, resources are easily wasted.

In view of this, embodiments of this application further provide a communication method. As shown in FIG. 11, the communication method may be applied to a CA or DU scenario, and specifically includes the following steps.

1101. A network device performs uplink communication on a first carrier in a first time unit through N receive antennas, and performs uplink communication on a second carrier in the first time unit through M receive antennas, where M and N are positive integers.

1102. The network device performs uplink communication on the second carrier in a second time unit through P receive antennas, where P is a positive integer, M<P≤M+N, the P receive antennas include the M receive antennas used by the second carrier and at least one receive antenna in the N receive antennas used by the first carrier, and the network device does not perform uplink communication on the first carrier in the second time unit.

Notably, in the communication method shown in FIG. 11, the first carrier and the second carrier may be uplink carriers of different terminal devices, or may be uplink carriers of different serving cells of a same terminal device. The first carrier and the second carrier may be uplink carriers in one serving cell of a same terminal device, or may be uplink carriers in different serving cells of a same terminal device. This is not limited.

Figure 12:
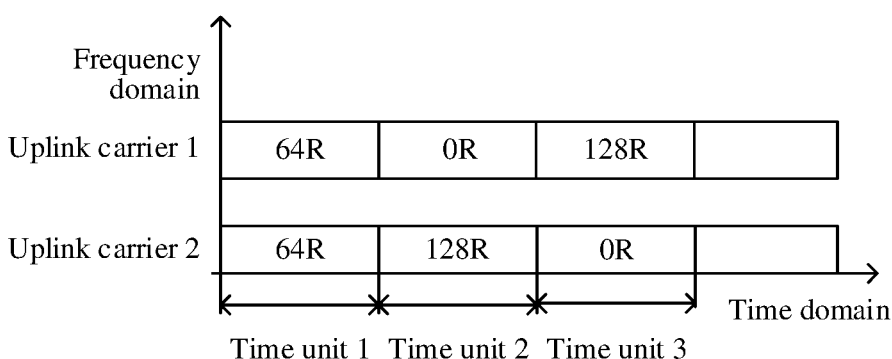
FIG. 12 is a schematic diagram of a case of using antennas by different carriers according to another embodiment of this application.

For example, an uplink carrier 1 and an uplink carrier 2 are used as an example. A quantity of receive antennas (receiving antenna, R for short) of the network device for the uplink carrier 1 is 64, and a quantity of receive antennas of the network device for the uplink carrier 2 is also 64. As shown in FIG. 12, the network device performs uplink communication on the uplink carrier 1 through 64 receive antennas in a time unit 1, and performs uplink communication on the uplink carrier 2 through 64 receive antennas in the time unit 1. The network device performs uplink communication on the uplink carrier 2 through 128 receive antennas in a time unit 2, and does not perform communication on the uplink carrier 1 in the time unit 2. The network device performs uplink communication on the uplink carrier 1 through 128 receive antennas in a time unit 3, and does not perform uplink communication on the uplink carrier 2 in the time unit 3. This helps improve uplink communication efficiency.

It may be understood that the receive antenna in step 1101 to step 1102 may alternatively be a receive antenna port or a channel.

In addition, in embodiments of this application, for some service scenarios in which uplink communication dominates, for example, city surveillance and a smart factory, the network device may configure M uplink carriers/bands/serving cells for the terminal device, and configure N downlink carriers/bands/serving cells for the terminal device, where M is greater than N, and M and N are positive integers. This is more applicable to the preceding service scenarios than that a quantity of downlink carriers/bands/serving cells configured for a conventional terminal device is greater than a quantity of uplink carriers/bands/serving cells. Alternatively, no limitation is imposed on a center frequency of an uplink carrier and a center frequency of a downlink carrier that are included in a same serving cell configured by the network device for the terminal device. In one case, one serving cell may include only a downlink carrier, and does not include an uplink carrier. In another case, a serving cell may include only an uplink carrier, and does not include a downlink carrier. In another case, a serving cell may include an uplink carrier and a downlink carrier, but the uplink carrier and the downlink carrier belong to different bands. The serving cell may be a primary cell or a secondary cell. In addition, in some possible examples, an uplink carrier of an uplink primary serving cell and a downlink carrier of a downlink serving cell may belong to different bands/frequency channel number. For example, a downlink PCell is configured as a carrier 1/band 1/serving cell 1, and an uplink PCell is configured as a carrier 2/band 2/serving cell 2. In addition, in some possible examples, in an inter-cell switching or mobility process, the network sends a PCell switching instruction to indicate that a downlink PCell and an uplink PCell may be switched together, or may be decoupled for switching, that is, indicate downlink PCell switching or uplink PCell switching. For example, at a moment 1, a downlink PCell is a carrier 1/band 1/serving cell 1, and an uplink PCell is configured as carrier 1/band 1/serving cell 1. In an inter-cell switching or mobility process, the network sends a PCell switching instruction to indicate to switch the downlink PCell to a carrier 2/band 2/serving cell 2 (the uplink PCell is still the carrier 1/band 1/serving cell 1), or sends a PCell switching instruction to indicate that the downlink PCell is not switched and is still the carrier 1/band 1/serving cell 1, but the uplink PCell is switched to the carrier 2/band 2/serving cell 2. In this way, downlink and uplink decoupling, PCell decoupling, and independent load balancing can be implemented, thereby achieving consistent uplink and downlink experience. In addition, in some possible examples, a PCell includes a downlink primary carrier and an uplink primary carrier. In an inter-cell switching or mobility process, the network sends a PCell switching instruction to indicate that a downlink carrier/frequency channel number/band and an uplink carrier/frequency channel number/band of the PCell may be switched together, or may be decoupled for switching, that is, indicate downlink carrier/frequency channel number/band switching of the PCell or uplink carrier/frequency channel number/band switching of the PCell. For example, at a moment 1, the network sends a PCell switching instruction to indicate to switch a downlink carrier/frequency channel number/band 1 of the PCell to a downlink carrier/frequency channel number/band 2, and not to switch an uplink carrier/frequency channel number/band 1 of the PCell; or sends a PCell switching instruction to indicate to switch an uplink carrier/frequency channel number/band 1 of the PCell to an uplink carrier/frequency channel number/band 2, and not to switch a downlink carrier/frequency channel number/band 1 of the PCell. In this way, downlink and uplink frequency channel number/band decoupling and independent load balancing can be implemented, thereby achieving consistent uplink and downlink experience. In another example, a serving cell of a terminal device in an FDD communication system is used as an example. The serving cell may include an uplink carrier with a center frequency of 900 MHz and a downlink carrier with a center frequency of 3.5 GHz. In this way, the cell configuration is more flexible. Therefore, based on the method in this embodiment, a 3.5 G downlink carrier and a 900 MHz uplink carrier are configured for the method. This method can obtain better uplink coverage than the conventional technology in which 3.5 G uplink and downlink carriers are configured, and can obtain a better downlink capacity than the conventional technology in which 900 MHz uplink and downlink carriers are configured.

A band is used as an example. As shown in FIG. 15, uplink carriers configured by the network device for the terminal device are UL1, UL2, UL3, and UL4, and downlink carriers configured by the network device for the terminal device are DL1, DL2, DL3, and DL4. UL1 and DL1 belong to a band A, UL2 and DL2 belong to a band B, UL3 and DL3 belong to a band C, and UL4 and DL4 belong to a band D. In this case, if the network device indicates the terminal device to activate DL1, UL2, DL3, and UL3, UL1, DL2, UL4, and DL4 are not activated. For example, DL1 may be a downlink carrier of the PCell of the terminal device, and UL2 is an uplink carrier of the PCell of the terminal device.

It can be understood that the foregoing embodiments of this application may be used separately, or may be used in combination with each other, to achieve different technical effects.

In the foregoing embodiments provided in this application, the methods provided in embodiments of this application are separately described from a perspective of interaction between the network device and the terminal device. To implement the functions in the foregoing methods provided in embodiments of this application, the base station or the terminal device may include a hardware structure and/or a software module, and implement the foregoing functions in a form of the hardware structure, the software module, or a combination of the hardware structure and the software module. Whether one of the foregoing functions is performed in the manner of a hardware structure, a software module, or a hardware structure and a software module depends on a specific application and design constraints of the technical solutions.

Figure 13:
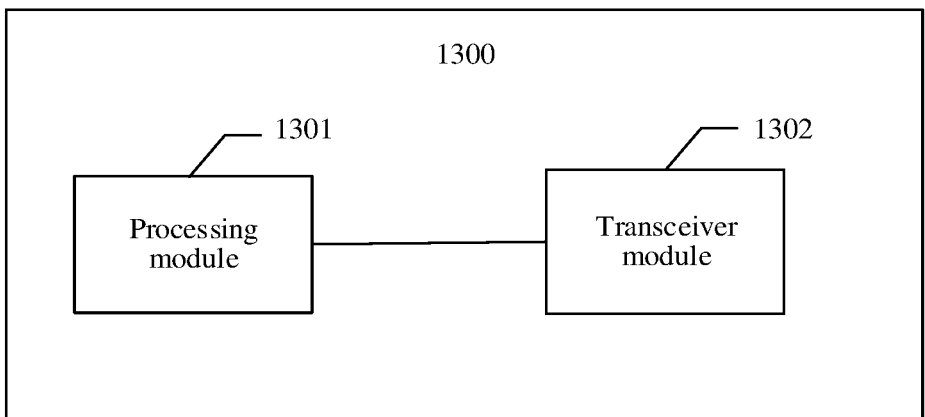
FIG. 13 is a schematic diagram of a structure of a communication apparatus according to an embodiment of this application.

Based on the same concept, FIG. 13 shows a communication apparatus 1300 according to this application. The communication apparatus 1300 includes a transceiver module 1302 and a processing module 1301.

In an example, the communication apparatus 1300 may be a terminal device, or may be an apparatus that can support the terminal device in implementing functions of the terminal device in the methods in FIG. 4, FIG. 5, and FIG. 7. For example, the communication apparatus 1300 may alternatively be an apparatus (for example, a chip or a chip system) in the terminal device. Notably, in embodiments of this application, the chip system may include a chip, or may include a chip and another discrete device.

For example, the transceiver module 1302 is configured to receive a first instruction from a network device. The first instruction indicates to switch a serving cell state to or from a first state. That the serving cell state is the first state includes: A downlink carrier of a serving cell supports downlink communication, and an uplink carrier of the serving cell does not support uplink communication. The processing module 1301 is configured to switch the serving cell state based on the first instruction.

In an example, the communication apparatus 1300 may be a network device, or may be an apparatus that can support the network device in implementing functions of the network device in the methods in FIG. 4, FIG. 5, and FIG. 7. For example, the communication apparatus 1300 may alternatively be an apparatus (for example, a chip or a chip system) in the network device. Notably, in embodiments of this application, the chip system may include a chip, or may include a chip and another discrete device.

For example, the processing module 1301 is configured to generate a first instruction. The transceiver module 1302 is configured to send the first instruction to a terminal device. The first instruction indicates to switch a serving cell state of a terminal device to or from a first state. That the serving cell state is the first state includes: A downlink carrier of a serving cell supports downlink communication, and an uplink carrier of the serving cell does not support uplink communication.

For specific execution processes of the processing module 1301 and the transceiver module 1302, refer to the descriptions in the foregoing method embodiments. Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

Figure 14:
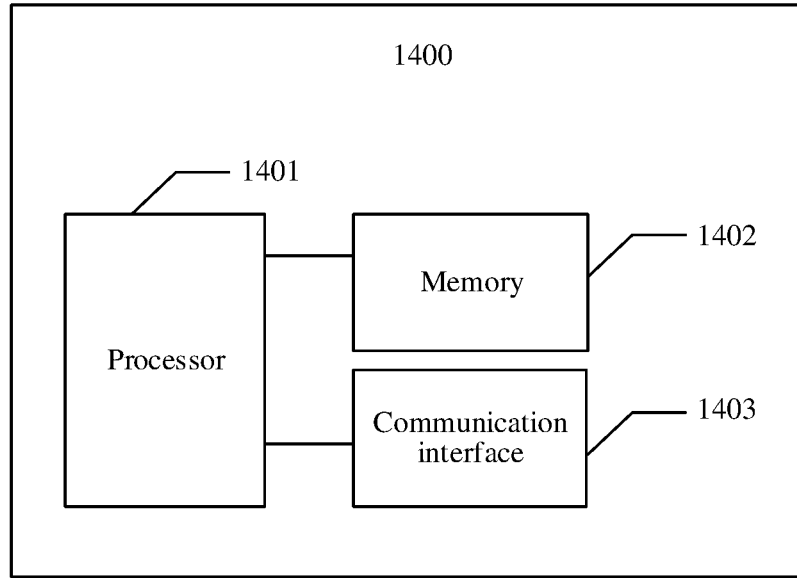
FIG. 14 is a schematic diagram of a structure of another communication apparatus according to an embodiment of this application.

The same as the foregoing concept, as shown in FIG. 14, embodiments of this application further provide a communication apparatus 1400.

In an example, the communication apparatus 1400 is configured to implement functions of the terminal device in the methods in FIG. 4, FIG. 5, and FIG. 7. The apparatus may be the terminal device, or may be an apparatus in the terminal device. The communication apparatus 1400 includes at least one processor 1401, configured to implement functions of the terminal device in the foregoing method. For example, the processor 1401 may be configured to switch a serving cell state based on a first instruction. For details, refer to detailed descriptions in the method. Details are not described herein again.

In another example, the communication apparatus 1400 is configured to implement functions of the network device in the methods in FIG. 4, FIG. 5, and FIG. 7. The apparatus may be a network device, or may be an apparatus in a network device. The communication apparatus 1400 includes at least one processor 1401, configured to implement functions of the network device in the foregoing method. For example, the processor 1401 may be configured to generate a first instruction. For details, refer to detailed descriptions in the method. Details are not described herein again.

In some embodiments, the communication apparatus 1400 may further include at least one memory 1402, configured to store a computer program and/or data. The memory 1402 is coupled to the processor 1401. Couplings in this embodiment of this application are indirect couplings or communication connections between apparatuses, units, or modules, may be implemented in an electrical form, a mechanical form, or another form, and are used for information exchange between the apparatuses, the units, or the modules. In another implementation, the memory 1402 may alternatively be located outside the apparatus 1400. The processor 1401 may operate with the memory 1402. The processor 1401 may execute the computer program stored in the memory 1402. At least one of the at least one memory may be included in the processor.

In some embodiments, the communication apparatus 1400 may further include a communication interface 1403, configured to communicate with another device through a transmission medium, so that an apparatus in the apparatus 1400 may communicate with the another device. For example, the communication interface 1403 may be a transceiver, a circuit, a bus, a module, or another type of communication interface, and the another device may be a terminal device or a network device. The processor 1401 receives and sends data and/or instructions through the communication interface 1403, and is configured to implement the method in the foregoing embodiments. For example, using an example in which the communication apparatus 1400 is a terminal device, the communication interface 1403 may be configured to receive a first instruction from a network device.

In embodiments of this application, a connection medium between the communication interface 1403, the processor 1401, and the memory 1402 is not limited. For example, in embodiments of this application, in FIG. 14, the memory 1402, the processor 1401, and the communication interface 1403 may be connected by a bus. The bus may be classified into an address bus, a data bus, a control bus, and the like.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, or may be any conventional processor or the like. The steps of the method disclosed with reference to embodiments of this application may be directly performed by a hardware processor, or may be performed by using a combination of hardware in the processor and a software module.

In embodiments of this application, the memory may be a nonvolatile memory, such as a hard disk drive (hHDD) or a solid-state drive (SSD), or may be a volatile memory, such as a random-access memory (RAM). The memory is any other medium that can carry or store expected program code in a form of an instruction structure or a data structure and that can be accessed by a computer, but is not limited thereto. The memory in embodiments of this application may alternatively be a circuit or any other apparatus that can implement a storage function, and is configured to store the program instructions and/or the data.

All or some of the methods in embodiments of this application may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method, comprising:

obtaining, by a terminal device, downlink capability information of the terminal device, wherein the downlink capability information of the terminal device comprises at least two of the following information:

a simultaneously configurable downlink band combination of the terminal device, indicating a quantity of downlink bands that are able to be simultaneously configured for the terminal device;

a simultaneously configurable downlink component carrier (CC) combination of the terminal device, indicating a quantity of downlink CCs that are able to be simultaneously configured for the terminal device;

a simultaneously configurable downlink serving cell combination of the terminal device, indicating a quantity of downlink serving cells that are able to be simultaneously configured for the terminal device;

a simultaneously activatable downlink band combination of the terminal device, indicating a quantity of downlink bands that are able to be simultaneously selected for activation;

a simultaneously activatable downlink CC combination of the terminal device, indicating a quantity of downlink CCs that are able to be simultaneously selected for activation;

a simultaneously activatable downlink serving cell combination of the terminal device, indicating a quantity of downlink serving cells that are able to be simultaneously selected for activation;

a simultaneously transmittable downlink band combination of the terminal device, indicating a quantity of downlink bands that are able to be simultaneously transmitted for the terminal device, wherein the simultaneously transmittable downlink band combination is usable by the terminal device to receive at least one of the following: downlink data, downlink control information, a downlink pilot signal, or a downlink synchronization signal;

a simultaneously transmittable downlink CC combination of the terminal device, indicating a quantity of downlink CCs that are able to be simultaneously transmitted for the terminal device, wherein the simultaneously transmittable downlink CC combination is usable by the terminal device to receive at least one of the following: downlink data, downlink control information, a downlink pilot signal, or a downlink synchronization signal;

a simultaneously transmittable downlink serving cell combination of the terminal device, indicating a quantity of downlink serving cells that are able to be simultaneously transmitted for the terminal device, wherein the simultaneously transmittable downlink serving cell combination is usable by the terminal device to receive at least one of the following: downlink data, downlink control information, a downlink pilot signal, or a downlink synchronization signal;

a switchable downlink band combination of the terminal device, indicating which downlink bands are able to be switched to each other, wherein the switchable downlink band combination is usable by the terminal device to receive at least one of the following: downlink data, downlink control information, a downlink pilot signal, or a downlink synchronization signal;

a switchable downlink CC combination of the terminal device, indicating which downlink CCs are able to be switched to each other, wherein the switchable downlink CC combination is usable by the terminal device to receive at least one of the following: downlink data, downlink control information, a downlink pilot signal, or a downlink synchronization signal; or a switchable downlink serving cell combination of the terminal device, indicating which downlink serving cells are able to be switched to each other, wherein the switchable downlink serving cell combination is usable by the terminal device to receive at least one of the following: downlink data, downlink control information, a downlink pilot signal, or a downlink synchronization signal; and reporting, by the terminal device, the downlink capability information of the terminal device to a network device; and wherein:

a quantity of simultaneously configurable downlink band combinations, a quantity of simultaneously configurable downlink CC combinations, or a quantity of simultaneously configurable downlink serving cell combinations of the terminal device is $N_1$, wherein $N_1$ is a positive integer;

a quantity of simultaneously activatable downlink band combinations, a quantity of simultaneously activatable downlink CC combinations, or a quantity of simultaneously activatable downlink serving cell combinations of the terminal device is $N_2$, wherein $N_2$ is a positive integer;

a quantity of simultaneously transmittable downlink band combinations, a quantity of simultaneously transmittable downlink CC combinations, or a quantity of simultaneously transmittable downlink serving cell combinations of the terminal device is $N_3$, wherein $N_3$ is a positive integer; and a quantity of switchable downlink band combinations, a quantity of switchable downlink CC combinations, or a quantity of switchable downlink serving cell combinations of the terminal device is $L_2$, wherein $L_2$ is a positive integer; and wherein $N_1$, $N_2$, $N_3$, and $L_2$ do not all have a same value.

2. The method according to claim 1, wherein $N_1 \geq N_2 \geq L_2 \geq N_3$.

3. The method according to claim 1, further comprising:

switching, by the terminal device, a channel used during communication on a first downlink carrier to a second downlink carrier, wherein the first downlink carrier is a downlink carrier currently used by the terminal device for downlink communication, and the first downlink carrier and the second downlink carrier belong to a same switchable downlink band combination, downlink CC combination, or downlink serving cell combination.

4. The method according to claim 1, further comprising:

reporting, by the terminal device, a switching latency to the network device, wherein the switching latency is related to at least two of the following: a source downlink band or CC, a target downlink band or CC, a quantity of source channels, a quantity of target channels, a quantity of source downlink bands or CCs, or a quantity of target downlink bands or CCs.

5. A method, comprising:

receiving, by a network device, downlink capability information from a terminal device, wherein the downlink capability information of the terminal device comprises at least two of the following information:

a simultaneously configurable downlink band combination of the terminal device, indicating a quantity of downlink bands that are able to be simultaneously configured for the terminal device;

a simultaneously configurable downlink component carrier (CC) combination of the terminal device, indicating a quantity of downlink CCs that are able to be simultaneously configured for the terminal device;

a simultaneously configurable downlink serving cell combination of the terminal device, indicating a quantity of downlink serving cells that are able to be simultaneously configured for the terminal device;

a simultaneously activatable downlink band combination of the terminal device, indicating a quantity of downlink bands that are able to be simultaneously selected for activation;

a simultaneously activatable downlink CC combination of the terminal device, indicating a quantity of downlink CCs that are able to be simultaneously selected for activation;

a simultaneously activatable downlink serving cell combination of the terminal device, indicating a quantity of downlink serving bands that are able to be simultaneously selected for activation;

a simultaneously transmittable downlink band combination of the terminal device, indicating a quantity of downlink bands that are able to be simultaneously transmitted for the terminal device, wherein the simultaneously transmittable downlink band combination is usable by the terminal device to receive at least one of the following: downlink data, downlink control information, a downlink pilot signal, or a downlink synchronization signal;

a simultaneously transmittable downlink CC combination of the terminal device, indicating a quantity of downlink CCs that are able to be simultaneously transmitted for the terminal device, wherein the simultaneously transmittable downlink CC combination is usable by the terminal device to receive at least one of the following: downlink data, downlink control information, a downlink pilot signal, or a downlink synchronization signal; or a simultaneously transmittable downlink serving cell combination of the terminal device, indicating a quantity of downlink serving cells that are able to be simultaneously transmitted for the terminal device, wherein the simultaneously transmittable downlink serving cell combination is usable by the terminal device to receive at least one of the following: downlink data, downlink control information, a downlink pilot signal, or a downlink synchronization signal; or a switchable downlink band combination of the terminal device, indicating which downlink bands are able to be switched to each other, wherein the switchable downlink band combination is usable by the terminal device to receive at least one of the following: downlink data, downlink control information, a downlink pilot signal, or a downlink synchronization signal;

a switchable downlink CC combination of the terminal device, indicating which downlink CCs are able to be switched to each other, wherein the switchable downlink CC combination is used by the terminal device to receive at least one of the following: downlink data, downlink control information, a downlink pilot signal, or a downlink synchronization signal; or a switchable downlink serving cell combination of the terminal device, indicating which downlink serving cells are able to be switched to each other, wherein the switchable downlink serving cell combination is usable by the terminal device to receive at least one of the following: downlink data, downlink control information, a downlink pilot signal, or a downlink synchronization signal; and configuring, by the network device, a transmission parameter of the terminal device based on the downlink capability information of the terminal device; and wherein:

a quantity of simultaneously configurable downlink band combinations, a quantity of simultaneously configurable downlink CC combinations, or a quantity of simultaneously configurable downlink serving cell combinations of the terminal device is $N_1$, wherein $N_1$ is a positive integer;

a quantity of simultaneously activatable downlink band combinations, a quantity of simultaneously activatable downlink CC combinations, or a quantity of simultaneously activatable downlink serving cell combinations of the terminal device is $N_2$, wherein $N_2$ is a positive integer;

a quantity of simultaneously transmittable downlink band combinations, a quantity of simultaneously transmittable downlink CC combinations, or a quantity of simultaneously transmittable downlink serving cell combinations of the terminal device is $N_3$, wherein $N_3$ is a positive integer; and a quantity of switchable downlink band combinations, a quantity of switchable downlink CC combinations, or a quantity of switchable downlink serving cell combinations of the terminal device is $L_1$, wherein $L_2$ is a positive integer; and wherein $N_1$, $N_2$, $N_3$, and $L_2$ do not all have a same value.

6. The method according to claim 5, wherein $N_1 \geq N_2 \geq L_2 \geq N_3$.

7. The method according to claim 5, further comprising:

receiving, by the network device, information of a switching latency from the terminal device, wherein the switching latency is related to at least two of the following: a source downlink band or CC, a target downlink band or CC, a quantity of source channels, a quantity of target channels, a quantity of source downlink bands or CCs, or a quantity of target downlink bands or CCs.

8. A communication apparatus, comprising:

at least one processor; and at least one non-transitory memory, wherein the at least one non-transitory memory stores a computer program that is executable by the at least one processor, and when the at least one processor executes the computer program, the communication apparatus is caused to:

obtain downlink capability information of a terminal device, wherein the downlink capability information of the terminal device comprises at least two of the following information:

a simultaneously configurable downlink band combination of the terminal device indicating a quantity of downlink bands that are able to be simultaneously configured for the terminal device;

a simultaneously configurable downlink component carrier (CC) combination of the terminal device indicating a quantity of downlink CCs that are able to be simultaneously configured for the terminal device;

a simultaneously configurable downlink serving cell combination of the terminal device indicating a quantity of downlink serving cells that are able to be simultaneously configured for the terminal device;

a simultaneously activatable downlink band combination of the terminal device, indicating a quantity of downlink bands that are able to be simultaneously selected for activation;

a simultaneously activatable downlink CC combination of the terminal device, indicating a quantity of downlink CCs that are able to be simultaneously selected for activation;

a simultaneously activatable downlink serving cell combination of the terminal device, indicating a quantity of downlink serving cells that are able to be simultaneously selected for activation;

a simultaneously transmittable downlink band combination of the terminal device, indicating a quantity of downlink bands that are able to be simultaneously transmitted for the terminal device, wherein the simultaneously transmittable downlink band combination is usable by the terminal device to receive at least one of the following: downlink data, downlink control information, a downlink pilot signal, or a downlink synchronization signal;

a simultaneously transmittable downlink CC combination of the terminal device, indicating a quantity of downlink CCs that are able to be simultaneously transmitted for the terminal device, wherein the simultaneously transmittable downlink CC combination is usable by the terminal device to receive at least one of the following: downlink data, downlink control information, a downlink pilot signal, or a downlink synchronization signal;

a simultaneously transmittable downlink serving cell combination of the terminal device, indicating a quantity of downlink serving cells that are able to be simultaneously transmitted for the terminal device, wherein the simultaneously transmittable downlink serving cell combination is usable by the terminal device to receive at least one of the following: downlink data, downlink control information, a downlink pilot signal, or a downlink synchronization signal;

a switchable downlink band combination of the terminal device, indicating which downlink bands are able to be switched to each other, wherein the switchable downlink band combination is usable by the terminal device to receive at least one of the following: downlink data, downlink control information, a downlink pilot signal, or a downlink synchronization signal;

a switchable downlink CC combination of the terminal device, indicating which downlink CCs are able to be switched to each other, wherein the switchable downlink CC combination is usable by the terminal device to receive at least one of the following: downlink data, downlink control information, a downlink pilot signal, or a downlink synchronization signal; or a switchable downlink serving cell combination of the terminal device, indicating which downlink serving cells are able to be switched to each other, wherein the switchable downlink serving cell combination is usable by the terminal device to receive at least one of the following: downlink data, downlink control information, a downlink pilot signal, or a downlink synchronization signal; and reporting the downlink capability information of the terminal device to a network device; and wherein:

a quantity of simultaneously configurable downlink band combinations, a quantity of simultaneously configurable CC combinations, or a quantity of simultaneously configurable downlink serving cell combinations of the terminal device is $N_1$, wherein $N_1$ is a positive integer;

a quantity of simultaneously activatable downlink band combinations, a quantity of simultaneously activatable downlink CC combinations, or a quantity of simultaneously activatable downlink serving cell combinations of the terminal device is $N_2$, wherein $N_2$ is a positive integer;

a quantity of simultaneously transmittable downlink band combinations, a quantity of simultaneously transmittable downlink CC combinations, or a quantity of simultaneously transmittable downlink serving cell combinations of the terminal device is $N_3$, wherein $N_3$ is a positive integer; and a quantity of switchable downlink band combinations, a quantity of switchable downlink CC combinations, or a quantity of switchable downlink serving cell combinations of the terminal device is $L_2$, wherein $L_2$ is a positive integer; and wherein $N_1$, $N_2$, $N_3$, and $L_2$ do not all have a same value.

9. The communication apparatus according to claim 8, wherein $N_1 \geq N_2 \geq L_2 \geq N_3$.

10. The communication apparatus according to claim 8, wherein when the at least one processor executes the computer program the communication apparatus is further caused to:

switch a channel used during communication on a first downlink carrier to a second downlink carrier, wherein the first downlink carrier is a downlink carrier currently used by the terminal device for downlink communication, and the first downlink carrier and the second downlink carrier belong to a same switchable downlink band combination, downlink CC combination, or downlink serving cell combination.

11. The communication apparatus according to claim 8, wherein when the at least one processor executes the computer program the communication apparatus is caused to:

report information of a switching latency to the network device, wherein the switching latency is related to at least two of the following: a source downlink band or CC, a target downlink band or CC, a quantity of source channels, a quantity of target channels, a quantity of source downlink bands or CCs, or a quantity of target downlink bands or CCs.

12. The communication apparatus according to claim 8, wherein the communication apparatus is the terminal device.

13. The communication apparatus according to claim 8, wherein the downlink capability information of the terminal device comprises first information and second information;

wherein the first information comprises the simultaneously configurable downlink band combination of the terminal device, the simultaneously configurable downlink CC combination of the terminal device, or the simultaneously configurable downlink serving cell combination of the terminal device; and wherein the second information comprises the simultaneously activatable downlink band combination of the terminal device, the simultaneously activatable downlink CC combination of the terminal device, or the simultaneously activatable downlink serving cell combination of the terminal device.

14. The communication apparatus according to claim 8, wherein the downlink capability information of the terminal device comprises first information and second information;

wherein the first information comprises the simultaneously transmittable downlink band combination of the terminal device, the simultaneously transmittable downlink CC combination of the terminal device, or the simultaneously transmittable downlink serving cell combination of the terminal device; and wherein the second information comprises the switchable downlink band combination of the terminal device, the switchable downlink CC combination of the terminal device, or the switchable downlink serving cell combination of the terminal device.

15. A communication apparatus, comprising:

at least one processor; and at least one non-transitory memory, wherein the at least one non-transitory memory stores a computer program that is executable by the at least one processor, and when the at least one processor executes the computer program the communication apparatus is caused to:

receive downlink capability information from a terminal device, wherein the downlink capability information of the terminal device comprises at least two of the following information:

a simultaneously configurable downlink band combination of the terminal device indicating a quantity of downlink bands that are able to be simultaneously configured for the terminal device;

a simultaneously configurable downlink component carrier (CC) combination of the terminal device indicating a quantity of downlink CCs that are able to be simultaneously configured for the terminal device; or a simultaneously configurable downlink serving cell combination of the terminal device indicating a quantity of downlink serving cells that are able to be simultaneously configured for the terminal device;

a simultaneously activatable downlink band combination of the terminal device, indicating a quantity of downlink bands that are able to be simultaneously selected for activation;

a simultaneously activatable downlink CC combination of the terminal device, indicating a quantity of downlink CCs that are able to be simultaneously selected for activation; or a simultaneously activatable downlink serving cell combination of the terminal device, indicating a quantity of downlink serving cells that are able to be simultaneously selected for activation;

a simultaneously transmittable downlink band combination of the terminal device, indicating a quantity of downlink bands that are able to be simultaneously transmitted for the terminal device, wherein the simultaneously transmittable downlink band combination is usable by the terminal device to receive at least one of the following: downlink data, downlink control information, a downlink pilot signal, or a downlink synchronization signal;

a simultaneously transmittable downlink CC combination of the terminal device, indicating a quantity of downlink CCs that are able to be simultaneously transmitted for the terminal device, wherein the simultaneously transmittable downlink CC combination is usable by the terminal device to receive at least one of the following: downlink data, downlink control information, a downlink pilot signal, or a downlink synchronization signal;

a simultaneously transmittable downlink serving cell combination of the terminal device, indicating a quantity of downlink serving cells that are able to be simultaneously transmitted for the terminal device, wherein the simultaneously transmittable downlink serving cell combination is usable by the terminal device to receive at least one of the following: downlink data, downlink control information, a downlink pilot signal, or a downlink synchronization signal; and a switchable downlink serving cell combination of the terminal device, indicating which downlink serving cells are able to be switched to each other, wherein the switchable downlink serving cell combination is used by the terminal device to receive at least one of the following: downlink data, downlink control information, a downlink pilot signal, and a downlink synchronization signal;

a switchable downlink band combination of the terminal device, indicating which downlink bands are able to be switched to each other, wherein the switchable downlink band combination is usable by the terminal device to receive at least one of the following: downlink data, downlink control information, a downlink pilot signal, or a downlink synchronization signal;

a switchable downlink CC combination of the terminal device, indicating which downlink CCs are able to be switched to each other, wherein the switchable downlink CC combination is usable by the terminal device to receive at least one of the following: downlink data, downlink control information, a downlink pilot signal, or a downlink synchronization signal; and configuring a transmission parameter of the terminal device based on the downlink capability information of the terminal device; and wherein:

a quantity of simultaneously configurable downlink band combinations, a quantity of simultaneously configurable downlink CC combinations, or a quantity of simultaneously configurable downlink serving cell combinations of the terminal device is $N_1$, wherein $N_1$ is a positive integer;

a quantity of simultaneously activatable downlink band combinations, a quantity of simultaneously activatable downlink CC combinations, or a quantity of simultaneously activatable downlink serving cell combinations of the terminal device is $N_2$, wherein $N_2$ is a positive integer;

a quantity of simultaneously transmittable downlink band combinations, a quantity of simultaneously transmittable downlink CC combinations, or a quantity of simultaneously transmittable downlink serving cell combinations of the terminal device is $N_3$, wherein $N_3$ is a positive integer; and a quantity of switchable downlink band combinations, a quantity of switchable downlink CC combinations, or a quantity of switchable downlink serving cell combinations of the terminal device is $L_1$, wherein $L_2$ is a positive integer; and wherein $N_1$, $N_2$, $N_3$, and $L_2$ do not all have a same value.

16. The communication apparatus according to claim 15, wherein $N_1 \geq N_2 \geq L_2 \geq N_3$.

17. The communication apparatus according to claim 15, wherein when the at least one processor executes the computer program the communication apparatus is caused to:

receive a switching latency from the terminal device, wherein the switching latency is related to at least two of the following: a source downlink band or CC, a target downlink band or CC, a quantity of source channels, a quantity of target channels, a quantity of source downlink bands or CCs, or a quantity of target downlink bands or CCs.

18. The communication apparatus according to claim 15, wherein the communication apparatus is a network device.

* * * * *